(12) United States Patent
Cole

(10) Patent No.: US 7,159,879 B2
(45) Date of Patent: Jan. 9, 2007

(54) BRAKING AND STEERING SYSTEM FOR A TRUCK, WHEELED PLATFORM, SKATEBOARD OR VEHICLE

(76) Inventor: Jeffrey Cole, 40 Gold Creek Ct., Danville, CA (US) 94506

( * ) Notice: Subject to any disclaimer, the term of this patent is extended or adjusted under 35 U.S.C. 154(b) by 0 days.

(21) Appl. No.: 10/980,626

(22) Filed: Nov. 2, 2004

(65) Prior Publication Data

US 2006/0091634 A1 May 4, 2006

(51) Int. Cl.
   A63C 17/02 (2006.01)
   A63C 1/24 (2006.01)

(52) U.S. Cl. .............. 280/87.042; 280/11.28; 280/11.204

(58) Field of Classification Search ........ 280/87.041, 280/87.042, 87.03, 11.27, 11.28, 11.211, 280/11.207, 11.204, 11.212, 11.215, 11.216, 280/11.217; 188/22, 77 W, 72.7, 2 D
See application file for complete search history.

(56) References Cited

U.S. PATENT DOCUMENTS

| | | | | |
|---|---|---|---|---|
| 2,330,147 A | | 9/1943 | Rodriguez | |
| 3,331,612 A | * | 7/1967 | Tietge | 280/11.28 |
| 4,076,266 A | * | 2/1978 | Krausz | 280/87.042 |
| 4,155,565 A | * | 5/1979 | de Caussin et al. | 280/87.042 |
| 4,165,090 A | * | 8/1979 | Feddersohn et al. | 280/87.042 |
| 4,196,916 A | * | 4/1980 | Schorr | 280/87.042 |
| 4,930,794 A | * | 6/1990 | Chan | 280/11.28 |
| 4,951,958 A | * | 8/1990 | Chao | 280/87.041 |
| 5,020,621 A | * | 6/1991 | Martin | 280/87.042 |
| 5,232,235 A | * | 8/1993 | Brooks | 280/87.042 |
| 5,330,214 A | * | 7/1994 | Brooks et al. | 280/87.042 |
| 5,522,620 A | * | 6/1996 | Pracas | 280/87.041 |
| 5,915,707 A | * | 6/1999 | Steffen | 280/87.03 |
| 5,947,495 A | * | 9/1999 | Null et al. | 280/87.042 |
| 5,950,754 A | * | 9/1999 | Ondrish, Jr. | 180/181 |
| 5,997,018 A | * | 12/1999 | Lee | 280/87.042 |
| 6,123,348 A | * | 9/2000 | Miller | 280/87.042 |
| 6,158,752 A | * | 12/2000 | Kay | 280/87.042 |
| 6,213,484 B1 | | 4/2001 | Rohner | |
| 6,419,248 B1 | * | 7/2002 | Kay | 280/87.042 |
| 6,488,296 B1 | * | 12/2002 | Ireton | 280/87.042 |
| 6,520,517 B1 | | 2/2003 | Chung et al. | |
| 6,659,480 B1 | * | 12/2003 | Newman | 280/87.042 |
| 6,811,165 B1 | * | 11/2004 | Chang | 280/87.041 |
| 6,820,881 B1 | * | 11/2004 | Berry | 280/87.042 |
| 6,848,527 B1 | * | 2/2005 | Nelson | 280/87.042 |
| 2002/0067015 A1 | | 6/2002 | Tierney et al. | |
| 2003/0155733 A1 | | 8/2003 | Tan et al. | |

* cited by examiner

Primary Examiner—Hau Phan
(74) Attorney, Agent, or Firm—Buchanan Ingersoll & Rooney PC

(57) ABSTRACT

A steering enhancement and braking system for a skateboard or wheeled platform having an actuating element configured to change the position of the skateboard deck relative to the skateboard truck. The actuating element comprises a deck plate configured to be attachable to a skateboard deck, and a truck plate configured to be attachable to a skateboard truck and the deck plate. Upon an application of a force to the skateboard deck the position of the truck plate relative to the deck plate changes. In addition, the system can achieve braking action by transferring the differential motion to the skateboard deck and the truck by the use of the actuating element.

6 Claims, 21 Drawing Sheets

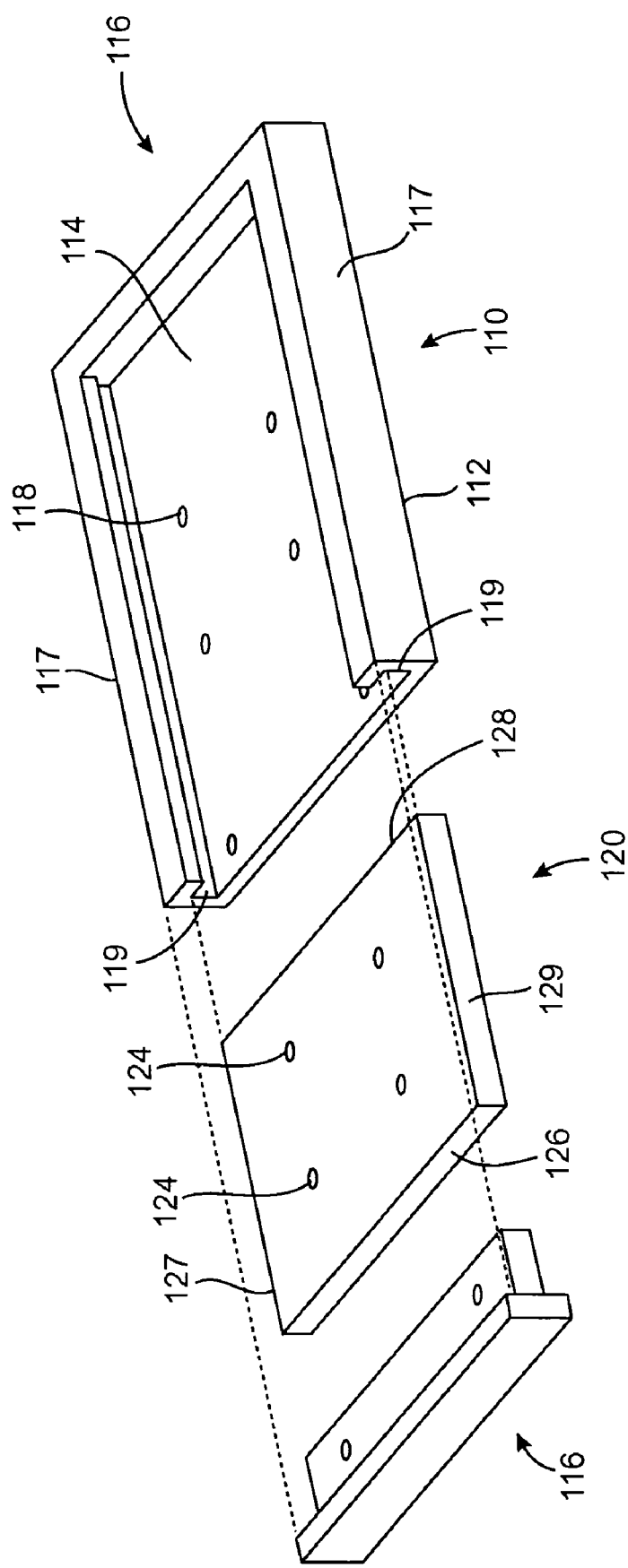

BRAKING AND STEERING SYSTEM FOR A TRUCK, WHEELED PLATFORM, SKATEBOARD OR VEHICLE

FIELD OF THE INVENTION

This invention relates to a braking and steering enhancement system for wheeled platforms and more particularly a braking and steering enhancement system for a skateboard.

BACKGROUND OF INVENTION

Existing skateboard braking systems rely on actuation systems that involve the use of hands, feet, and/or other body parts. Typically, the hand-actuated braking systems involve the squeezing of the hands or fingers. Foot actuated braking systems require the relocation or repositioning of all or part of one or more feet from one position to a second position on the skateboard. Many of these existing braking systems require the use of specialized skateboard elements such as integrated brake/truck systems, or integrated brake/deck systems.

In snowboarding, the feet are placed within specialized snowboard boots that are typically bound to the snowboard deck by specialized bindings. Even though the snowboard rider's feet are fixed to one position relative to the snowboard deck the snowboard rider is capable of slowing or stopping the snowboard by causing the trailing end and uphill edge of the snowboard to scrape or slide laterally across the snow while making a turn. The snowboard rider presses somewhat harder with the rider's trailing leg, relative to the riders leading leg, to force the trailing end of the snowboard to "fishtail" or slide out from under his body more than the front or leading end of the board. This extra leg pressure on the trailing end is pressed laterally, transversely, or roughly perpendicular to longitudinal axis of the snowboard. This differential leg pressure causes the trailing end of the snowboard to scrape or slide across the snow creating greater friction and resistance to forward momentum, thus slowing the board without having to reposition the location of the feet with respect to the board.

Similarly, surfers manage to quickly redirect their surfboards and slow their motion through the water by "kicking" or pressing hard laterally, transversely or roughly perpendicular to the longitudinal axis of the surfboard with the trailing leg, which is on the trailing end of the board as it moves through the water. This redirection and slowing of the surfboard can be accomplished without repositioning the foot on the surfboard. In fact, some surfboards are equipped with special footpads at the trailing end of the board in order to assist the rider and keep his trailing foot in one place when the rider pushes more forcefully with the trailing leg during turning or slowing maneuvers.

Existing skateboard designs may allow enhanced turning characteristics and relatively uncontrolled braking characteristics by applying lateral forces across the deck of the boards. The problem with these existing designs is that they either do not provide the controlled braking/fishtailing response of snowboard riding, or they require highly skilled riding abilities, which may be relatively unsafe, especially when implemented without the use of hand- or foot-actuated braking mechanisms. Strong lateral forces applied to the deck of most common skateboard designs may cause the wheels to slide sideways relative to the plane of the wheels' rotation. While this method of riding tends to slow the skateboard's velocity and enhances the turning characteristics, it does so in such a way that requires the wheels to slide sideways rather than roll across the ground surface, which may be considered unsafe. Other skateboard truck designs provide a given fishtailing effect for a given skateboard turn radius, but application of lateral forces across the deck of the board during these turns do not provide controlled braking responses and tend to reduce the fishtailing response rather than increase the fishtailing response. Decreasing the fishtailing response when extra pressure is applied laterally with the trailing leg conflicts with the desired response, this is one that is more similar to snowboarding, wherein extra trailing leg pressure increases the fishtailing response.

In order to more completely simulate the sensation of the "only-on-command" fishtailing, slowing or stopping action of snowboarding or surfing, what is needed is a skateboard actuation system that, regardless of the skateboard's current radius of curvature, modifies and enhances the turning characteristics and/or implements controlled braking responses only on-command by simply pushing with the legs roughly perpendicular to the longitudinal axis of the skateboard deck, such that the skateboard wheels continue rolling in their modified plane of rotation when the actuation system is applied. The fishtailing and/or slowing response of the braking system should both be adjustable to suit the needs and preferences of individual riders. For example, some riders will prefer no enhanced turning response or "fishtailing" when lateral leg forces and brakes are applied. Some riders will prefer a large amount of lateral play at the trailing end of the board when the brakes are applied. Alternatively, some riders will prefer a "fishtailing" response while turning without the application of brakes. Furthermore what is needed is an actuation system that can be adapted to all existing skateboard deck and truck designs such that the only-on-command fishtailing and/or braking responses can be added to the existing characteristics of the riders favorite skateboard design.

Accordingly, what is desired is a system of actuating a skateboard brake and/or steering enhancement system while the board is following a path with any radius of curvature that simulates the slowing, braking or fishtailing motions used in snowboarding or surfing in a safe and controlled manner wherein the wheels continue to roll on the ground surface without sliding sideways. In addition, it is desirable to have a skateboard braking system that can be actuated by increasing the lateral pressure applied by the legs across the deck of the skateboard roughly perpendicular to longitudinal axis of the skateboard deck by the legs without having to reposition the feet relative to the board's deck or use hands to actuate the braking system. In addition, it is desirable to have a braking and/or fishtailing system that does not necessarily alter the riding and steering characteristics of the original board (not equipped with the braking/fishtailing system) so long as some lateral force across the trailing end of the board does not exceed some user-defined threshold force. In other words, the riding sensation, when not intentionally trying to fishtail or brake, should be virtually identical to that sensation of riding the board when it is not equipped with the braking/fishtailing system.

SUMMARY OF THE INVENTION

In one aspect of the invention, a steering enhancement system for a skateboard comprises: a deck plate configured to be attachable to a skateboard deck; and a truck plate configured to be attachable to a skateboard truck and the deck plate, wherein upon an application of a force to the skateboard deck, the position of the truck plate relative to the deck plate changes.

In another aspect of the invention, a skateboard comprises: a truck comprising an axle configured to receive at least one skateboard wheel; and a skateboard deck configured to be attachable to the truck, wherein upon an application of a force to the skateboard deck the position of the truck relative to the skateboard deck changes.

In a further aspect of the invention, a skateboard comprises: a skateboard deck; at least one skateboard truck, the skateboard truck being adapted to be attachable to the skateboard deck and comprising at least one axle configured to receive a wheel; an actuating element comprising: a deck plate configured to be attachable to a skateboard deck; and a truck plate configured to be attachable to a skateboard truck and the deck plate, wherein upon an application of a force to the skateboard deck, the position of the truck plate relative to the deck plate changes; and at least one wheel attached to the at least one axle of the skateboard truck.

In another aspect of the invention, a skateboard comprises: a skateboard deck; a first skateboard truck configured to be attachable to one end of the deck and comprising at least one axle configured to receive at least one wheel; a second skateboard truck, the second skateboard truck being adapted to be attachable to another end of the skateboard deck and comprising at least one axle configured to receive at least one wheel and having an actuating element positioned between the deck and truck, the actuating element comprising: a deck plate configured to be attachable to a skateboard deck; and a truck plate configured to be attachable to a skateboard truck and the deck plate, wherein upon an application of a force to the skateboard deck, the position of the truck plate relative to the deck plate changes; at least one wheel attached to the at least one axle of each of the skateboard trucks.

In one aspect of the invention, a brake system for a skateboard comprises: a skateboard truck; an actuating element comprising: a deck plate configured to be attachable to a skateboard deck; and a truck plate configured to be attachable to a skateboard truck and the deck plate, wherein upon an application of a force to the skateboard deck, the position of the truck plate relative to the deck plate changes; and a brake system connected to the actuating element by brake cables, wherein the brake system is engaged by differential motion of the actuating element and configured to reduce a rotational velocity of a wheel.

In a further aspect of the invention, a system for a wheeled platform comprises: a platform plate configured to be attachable to a platform; and a wheel plate configured to be attachable to a wheel support and the platform plate and having a position relative to the platform plate, wherein the position of the platform plate and the wheel plate changes upon an action of a user.

In another aspect of the invention, a skateboard truck comprises: a base plate; and a pivot cup configured to fit within the base plate, wherein the pivot cup is configured to move laterally within the base plate upon an application of a force to a deck of a skateboard.

In one aspect of the invention, a skateboard truck comprises: a base plate; and a dynamic king pin, wherein the king pin is configured to ease or tighten a pressure on an upper or bottom cushion in response to differential motion between the base plate and a deck of a skateboard.

In a further aspect of the invention, a steering enhancement system for a skateboard comprises a plate of an elastic material positioned between a deck of a skateboard and a skateboard truck, wherein upon an application of a force to the deck of the skateboard, the plate laterally displaces the skateboard truck.

In another aspect of the invention, a steering enhancement system for a skateboard comprises: a skateboard deck; and a pivoting truck system configured to attachable to the skateboard deck, the system comprising: a pair of skateboard trucks; a pair of actuating elements; a pivot element; a support member, wherein the support member connects the pair of skateboard trucks, the pair of actuating elements and the pivot element to one another; and wherein the skateboard deck rotates around the pivot element, such that upon a force to the skateboard deck the relative position of the skateboard deck and actuating elements change.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 8B shows a perspective view of an alternative embodiment of the actuating element of FIG. 8A.

DESCRIPTION OF THE INVENTION

Figure 1:
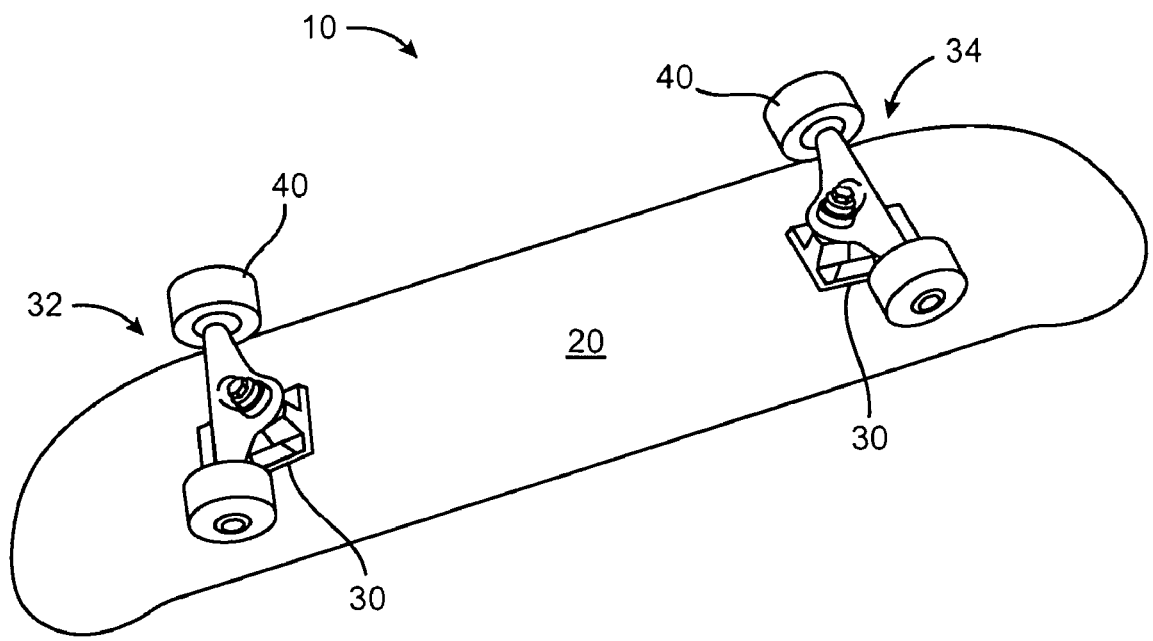
FIG. 1 shows a perspective view of a skateboard.

As shown in FIG. 1, a skateboard 10 typically comprises a deck 20, a pair of skateboard trucks 30, and a plurality of wheels 40, most commonly four (4) wheels. Existing skateboard products have anywhere from 2 to 14 or more wheels. Skateboard trucks 30 made by various manufacturers vary significantly in design, but the most common designs (FIG. 2) typically have two (2) axle extensions 66, which protrude laterally from the sides of the truck 30 upon which the skateboard wheels 40 and bearings are mounted. Skateboard trucks 30 are typically mounted to the skateboard deck 20 in a front 32 (or leading) and rear 34 (or trailing) position along the longitudinal or lengthwise axis of the skateboard deck 20 such that, at rest, the truck axle extensions 66 at the leading position 32 are roughly parallel to the truck axle extensions 66 at the trailing position 34 and all truck axle extensions 66 are roughly perpendicular to the longitudinal axis of the skateboard deck 20 when the skateboard 10 is at rest. If this approximately-parallel alignment of the trucks 30 and their respective axles are maintained while the skateboard 10 rolls along the ground, the skateboard's path will be relatively straight.

The skateboard deck 20 most commonly comprises a single piece of fiberglass, wood, wood laminates or wood composite or any suitable material for the skateboard deck 20. In addition, the deck 20 can have variable degrees of stiffness and flexibility based on the weight of the rider and the riders skateboarding style, i.e. gradual turns or a more aggressive pumping action of the skateboard deck 20. Some skateboard decks 20 consist of multiple pieces and/or are made from a combination of different materials.

Figure 2:
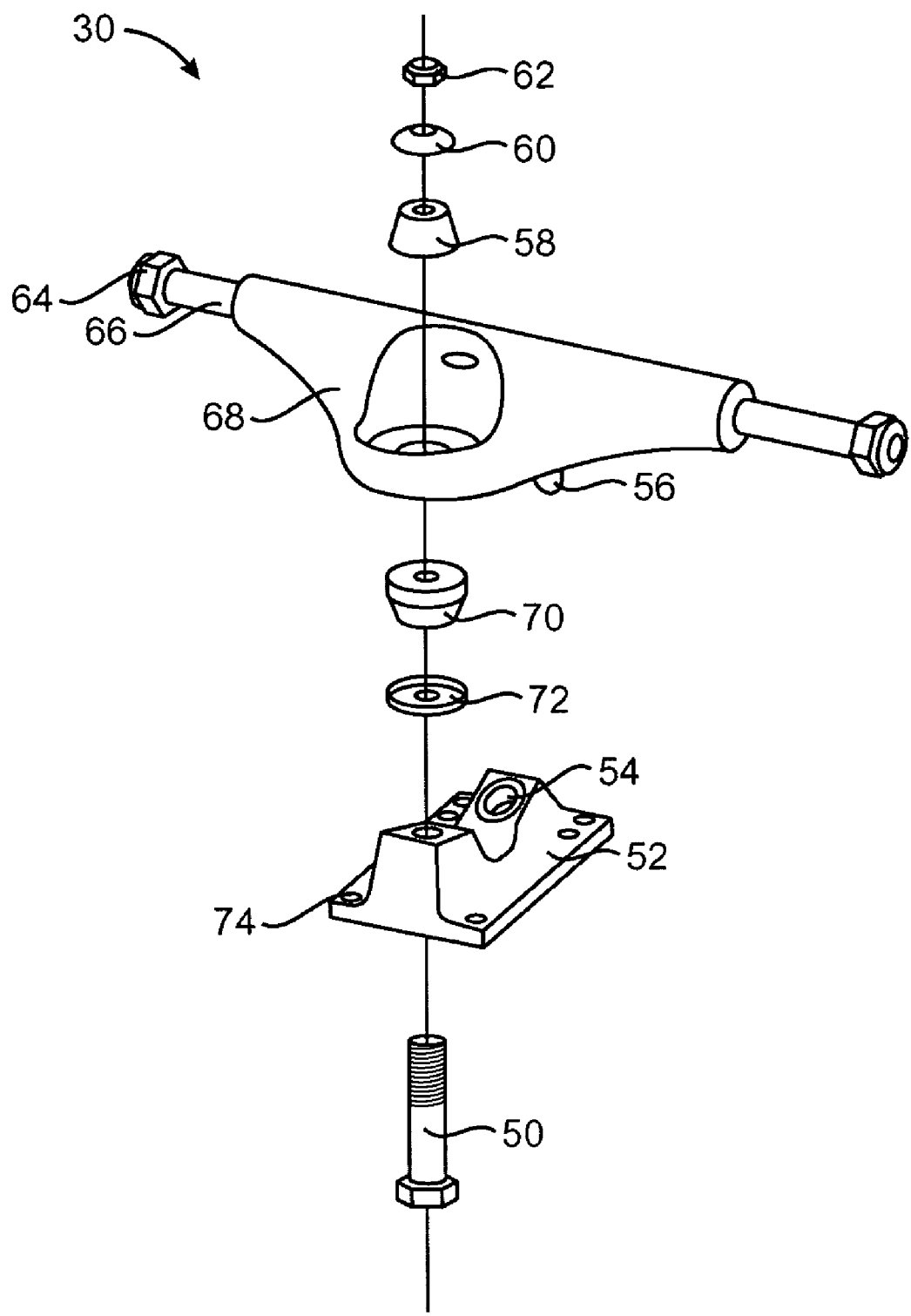
FIG. 2 shows an exploded perspective view of a skateboard truck.

FIG. 2 shows an exploded perspective view of a common style of skateboard truck 30. However, it can be appreciated that the embodiments described herein can be implemented with any skateboard truck 30 and skateboard truck design.

As shown in FIG. 2, a common skateboard truck 30 comprises a kingpin 50, a base plate 52, a pivot cup 54, a pivot 56, an upper cushion (aka bushing) 58, an upper cushion washer 60, a kingnut 62, a pair of axle nuts 64, a hanger 68, axle extensions 66 which protrudes from two ends of the hanger 68, a bottom cushion (aka bushing) 70 and a bottom cushion washer 72.

The base plate 52 has a plurality of openings 74. The openings 74 are configured to each receive bolts (not shown) for attaching the base plate 52 of the truck 30 to the deck 20 of the skateboard 10. Each of the two axle extensions 66 can receive a wheel 40. The wheel 40 preferably includes bearings (not shown), and washers or spacers (not shown), which properly position the bearings and wheels 40 such that they can freely spin without rubbing against the hanger 68. The wheel 40 is secured to the axle extension 66 with an axle nut 64.

The plurality of wheels 40, are preferably skateboard wheels or suitable wheels preferably having bearings, which can be attached to the wheels and which fit over the axle extension 66 of the skateboard truck 30. The at least one axle extension 66 preferably protrudes from hanger 68 and is configured to receive a wheel 40. It can be appreciated that the skateboard 10 can be equipped with a hydraulic truck as shown in U.S. patent application Ser. No. 10/874,134, filed Jun. 21, 2004, which is incorporated herein in its entirety, in the front or rear of the skateboard and one standard truck at the opposite end of the skateboard. Alternatively, multiple hydraulic trucks can be mounted on the skateboard 10.

Figure 3:
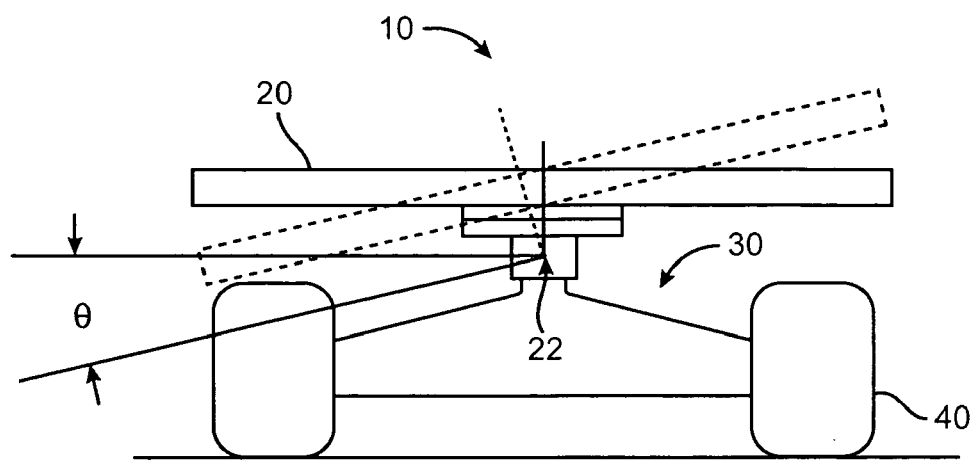
FIG. 3 shows an end view of a skateboard.

FIG. 3 shows an end view of a skateboard 10. As shown in FIG. 3, the weight of the skateboarder upon shifting his or her weight from side to side of the skateboard 10 causes the deck 20 of the skateboard to rotate about a pivot point 22, which is typically below the plane of the deck 20 of the skateboard 10. The pivot point 22 is typically located in the vicinity of the bushings 58, 70 of a common truck (FIG. 2). However, it can be appreciated that the pivot point 22 can be located in any position relative to the skateboard deck and the point may not be directly associated with a physical element on the skateboard (e.g. FIG. 18). The pivot points 22 for a leading truck and a trailing truck are preferably each located on a plane which is perpendicular to the skateboard deck 20, and which also passes through the longitudinal axis of the skateboard deck 20. The skateboard deck's 20 axis of rotation is defined by an imaginary line, which connects the two pivot points 22 on the leading and trailing trucks 30. It can be appreciated that the axis of rotation may not be so positioned without deviating from this invention.

Figure 4:
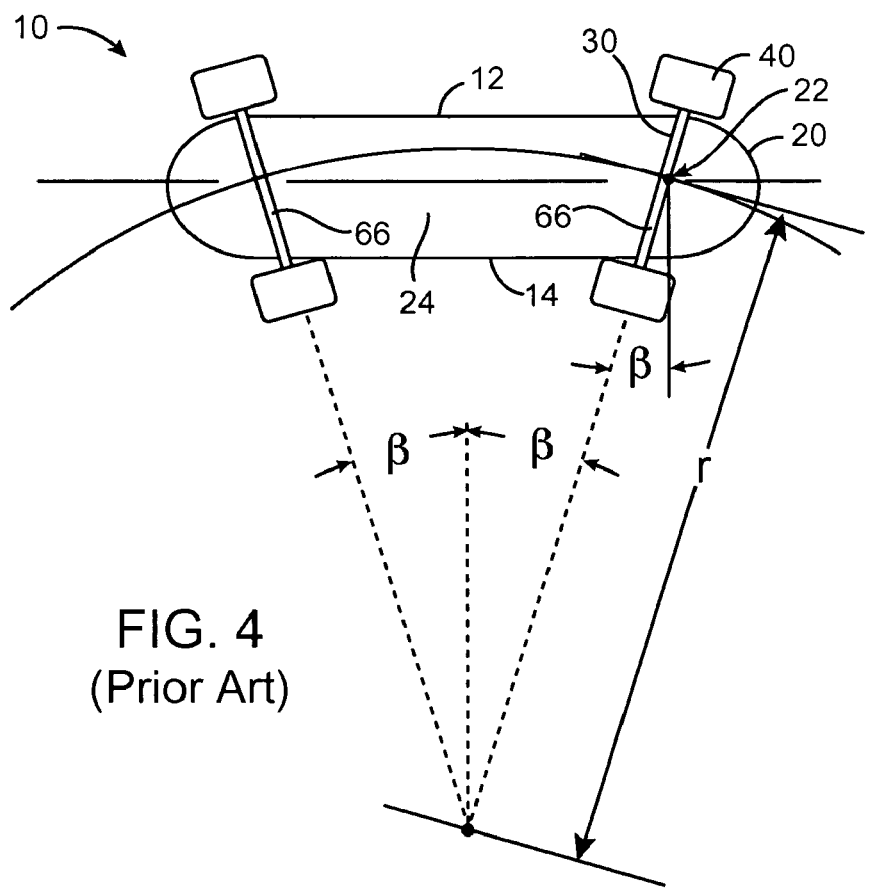
FIG. 4 shows a plan view of a skateboard.

FIG. 4 shows a bottom view of the skateboard 10 showing the skateboard's turning radius. As shown in FIG. 4, the turning path of the skateboard 10 will curve in the direction of the edge 14 of the skateboard that has been forced downwards. The greater the deck dipping angle, theta ($\theta$), as seen in FIG. 3, of the skateboard deck 20 measured from its resting position and around the longitudinal axis connecting points 22, the greater the trucks' 30 turning angles, beta ($\beta$), from their resting parallel position, measured around a vertical axis passing through pivot points 22, and the shorter the turning radius, r, of the skateboard's path. When one edge 14 of the skateboard deck 20 is rotated downward by the deck dipping angle theta ($\theta$), around the longitudinal axis connecting pivot points 22, the ends of the axle extensions 66 on that side of the skateboard 10 are caused to mechanically move towards one another, thus achieving the potential for the skateboard 10 to have a curved path.

As shown in FIG. 4, the skateboard's path becomes curved when the axles 66 of the two trucks 30 are caused to have an alignment, which is no longer parallel to one another and no longer perpendicular to the longitudinal axis of the skateboard deck 20. The variable turning angle, beta ($\beta$), that the axle extension 66 of a truck 30 makes relative to its resting position (perpendicular to the longitudinal axis of the skateboard deck), is typically similar in magnitude, but opposite in direction, for each of the two trucks 30. It can be appreciated that the beta angle for the front and rear trucks 30 may be designed to be different from one another for a given dip angle, theta ($\theta$), of the deck 20 without deviating from this invention.

The truck axle extensions 66 positions and alignment are designed to respond variably to different changes in the deck dipping angle, theta ($\theta$), of the skateboard deck 20 from a first position to a second position. The path of the skateboard 10 will curve in the direction of the edge 14 of the skateboard deck 20 that has been forced downwards. The greater the deck dipping angle, theta ($\theta$), of the skateboard deck 20, the greater the trucks' 30 turning angle, beta ($\beta$), from their resting position and the shorter the radius of curvature, r, of the skateboards 10 path.

Trucks 30 have various mechanical designs. Trucks 30 are designed by different manufacturers to have different and varying mechanical and/or turning angle beta ($\beta$), responses to the deck dipping angle, theta ($\theta$) of the skateboard deck 20 upon which the trucks 30 are mounted. Some trucks 30 have no moving parts and rely on the geometry of the truck axle to facilitate the skateboard's 10 variable turning radius when the deck 20 is variably rotated from its resting position. Some trucks have single wheels (1), some have two (2) wheels, some trucks have three (3) wheels, and some others have seven (7) wheels. Mechanically, these trucks 30 appear and operate differently from one another but share a similar goal: a dynamic steering system which responds to the dipping of the skateboard deck 20 around the axis parallel to the longitudinal axis of the deck 20. None of these prior truck 30 designs allows optional, on-command decreases in turning radius, increases in the turning angle, beta ($\beta$), fishtailing, or braking capacity as a result increased pressure applied roughly perpendicular to the longitudinal axis of the skateboard 10, initiated at any radii of curvature of the skateboard path 10 while having the skateboard wheels 40 maintaining non-skid rolling contact with the ground surface.

It is typical, but not universal, that the magnitude of the turning response, beta ($\beta$), of both of the skateboard trucks 30 on the skateboard 10 will be similar to each other but opposite in direction such that an imaginary linear extension of each trucks axle extensions 66 will cross and define a radius of curvature of the skateboard's 10 path. Some skateboard designs include one truck that does not ever change its orientation with respect to the deck and instead relies entirely on the other truck's response to the dipping deck 20 to enable the skateboard 10 to be steered by the rider. The greater the deck dipping angle, theta ($\theta$), of the skateboard deck 20, the greater the turning angle, beta ($\beta$), of each typical truck 30, and the smaller the turning radius, (r), of the skateboard's 10 path. Some skateboard 10 designs have a designated front (or leading) truck 30 and rear (or trailing) truck 30. The rear truck's 30 response may be more responsive to decking dipping angle, theta ($\theta$), thereby providing a fishtailing motion, which is not optional at increased deck dipping angles, theta ($\theta$).

Fishtailing Motion

Figure 5:
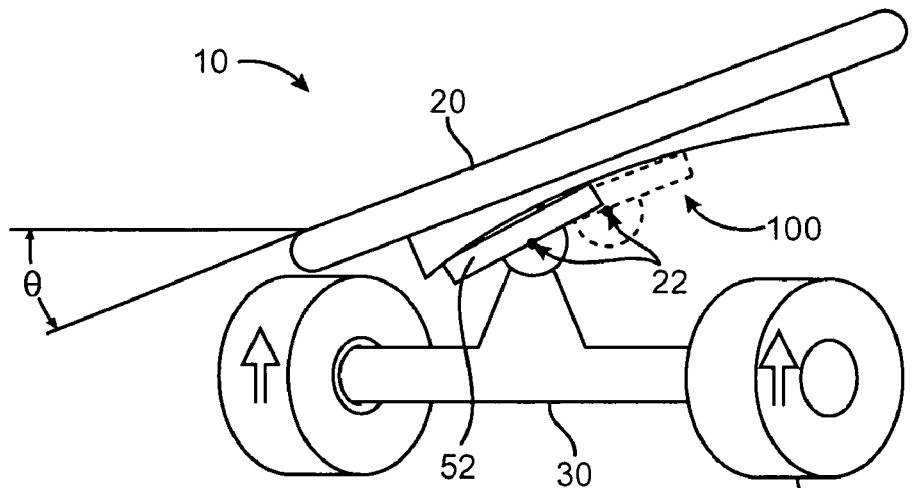
FIG. 5 shows an end view of a skateboard having an actuating element.
Figure 6:
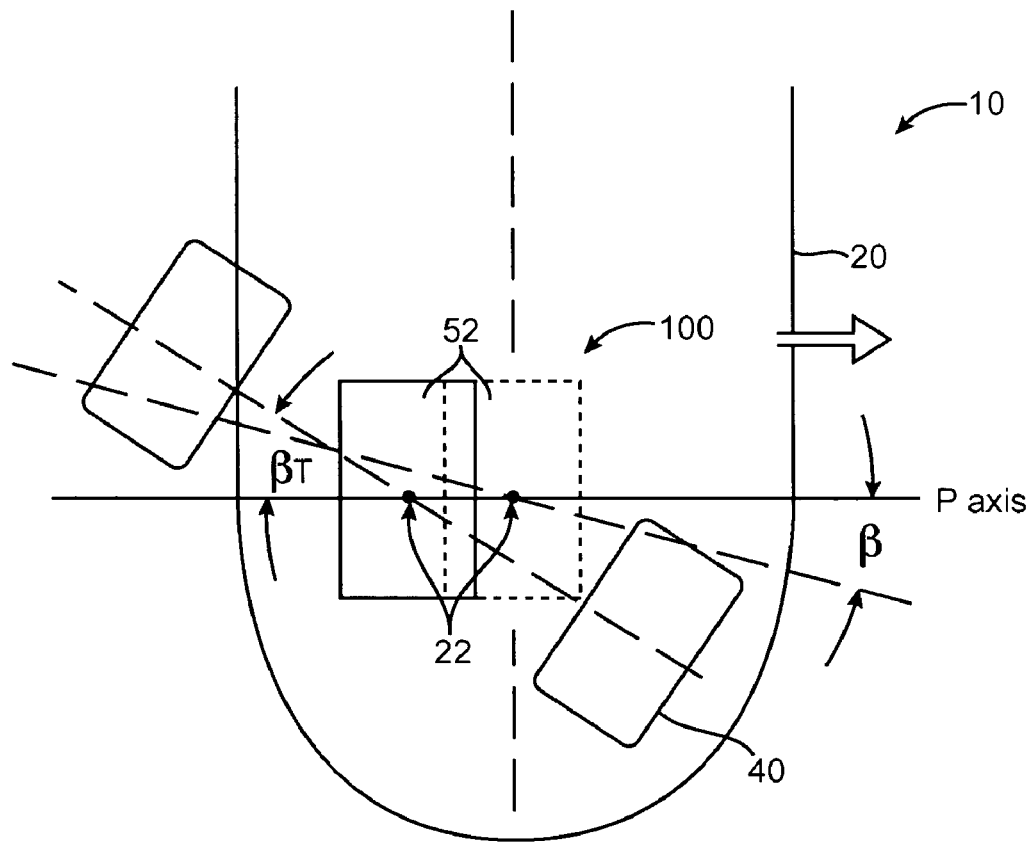
FIG. 6 shows a bottom view of a skateboard deck having an actuating element as shown in FIG. 5.

A fishtailing motion on the skateboard 10 can be derived by, and defined by, an increase in either truck's turning angle, beta ($\beta$), herein referred to as beta-T ($\beta$-T), relative to the turning angle on the other truck, beta-L ($\beta$-L) or other wheels on the vehicle. In the remaining discussion, beta-T ($\beta$-T) will represent an increased turning angle for the skateboard's 10 trailing truck relative to the turning angle, beta-L ($\beta$-L), of the skateboard's leading truck. As shown in FIGS. 5 and 6, the turning angle is measured around a vertical axis through pivot point 22 relative to a perpendicular drawn from the longitudinal axis of the skateboard deck 20 passing through pivot point 22. The position of pivot point 22 may be allowed to mechanically change its position relative to the skateboard deck 20. It is one intent of this invention to define an actuating element 100, which can, when optionally engaged on-command by the rider, facilitate this fishtailing motion or increase in beta-T without altering the deck dipping angle, theta ($\theta$). It can be appreciated that the actuating element 100 does not necessarily always cause fishtailing motions. Rather, the actuating element 100 can optionally, and on-command, create and cause a wide variety of effects including, but not limited to, braking, fishtailing, path straightening, and switching on lights or other visual or audible effects, or providing physical input to electronic sensors.

Changing the orientation of the truck's base plate 52 with respect to the skateboard deck 20 can enhance the turning angle, beta ($\beta$), of a given truck 30. Typically, skateboard trucks 30 are fixedly attached to the skateboard deck 20 by attaching the truck's base plate 52 directly to the skateboard deck 20. If the orientation of the base plate 52 is allowed to move in controlled ways relative to the skateboard deck, the trailing turning angle, beta-T ($\beta$-T), can be enhanced to increase beyond that angle, beta ($\beta$). Again, beta ($\beta$) is defined as the turning angle, which the truck 30 would have achieved solely in response to deck's rotation around the longitudinal axis through the skateboard's pivot points 22, if the truck's 30 base plate 52 was fixedly attached to the skateboard deck 20 without the actuating element 100. It can be appreciated that any or all trucks 30 on the skateboard, or any other wheel on a wheeled platform or vehicle, can contain the actuating elements 100 described herein. It is not necessary that the actuating element 100 be equipped only at the trailing end of the skateboard 10.

A change in the orientation of the truck's base plate 52, with respect to a normal, fixedly-attached position of the base plate 52 to the skateboard deck 20 can achieve an increasing (or decreasing) beta-T ($\beta$-T) as compared to beta-L ($\beta$-L). The resting position of the base plate 52 is defined to be co-planar with that portion of the skateboard deck 20 to which the base plate 52 would normally be attached and symmetrically located along the longitudinal axis of the skateboard deck 20. The point at which the truck 30 is attached to the deck 20 can be on a surface that is either parallel to the ground surface upon which the skateboard 10 rests, or on other deck 20 surfaces which are not parallel to the ground upon which the skateboard 10 rests.

The resting position of the base plate 52 of the truck 30 is also defined to be oriented in such a way that the truck's axle extensions 66 will be oriented perpendicular to a vertical plane which passes through the longitudinal axis of the skateboard deck 20. Defining a line, L, this is the intersection of the vertical plane passing through the longitudinal axis of the skateboard deck 20 and the plane surface upon which the trucks base plate 52 attaches to the skateboard deck 20. Defining a line, P, this is perpendicular to line L and co-planar with the mounting surface of the truck's base plate 52. Defining a third line, V, this is perpendicular to the plane of the surface of the truck's base plate 52 and orthogonal to lines L and P. The lines L, P, and V define three orthogonal axes. It can be appreciated that any three orthogonal axes can be defined by similar means for wheeled platforms or vehicles which do not contain skateboard parts, with deviating from this invention.

Rotation of the truck's base plate 52 from its resting position around any axis which is parallel to lines L, P, or V in a yet-to-be-specified direction will enhance the deviation angle, beta ($\beta$), to increase to a larger deviation angle, beta-T ($\beta$-T), or to smaller angles, or to reverse the direction of the deviation angle, beta ($\beta$), all together.

Figure 7:
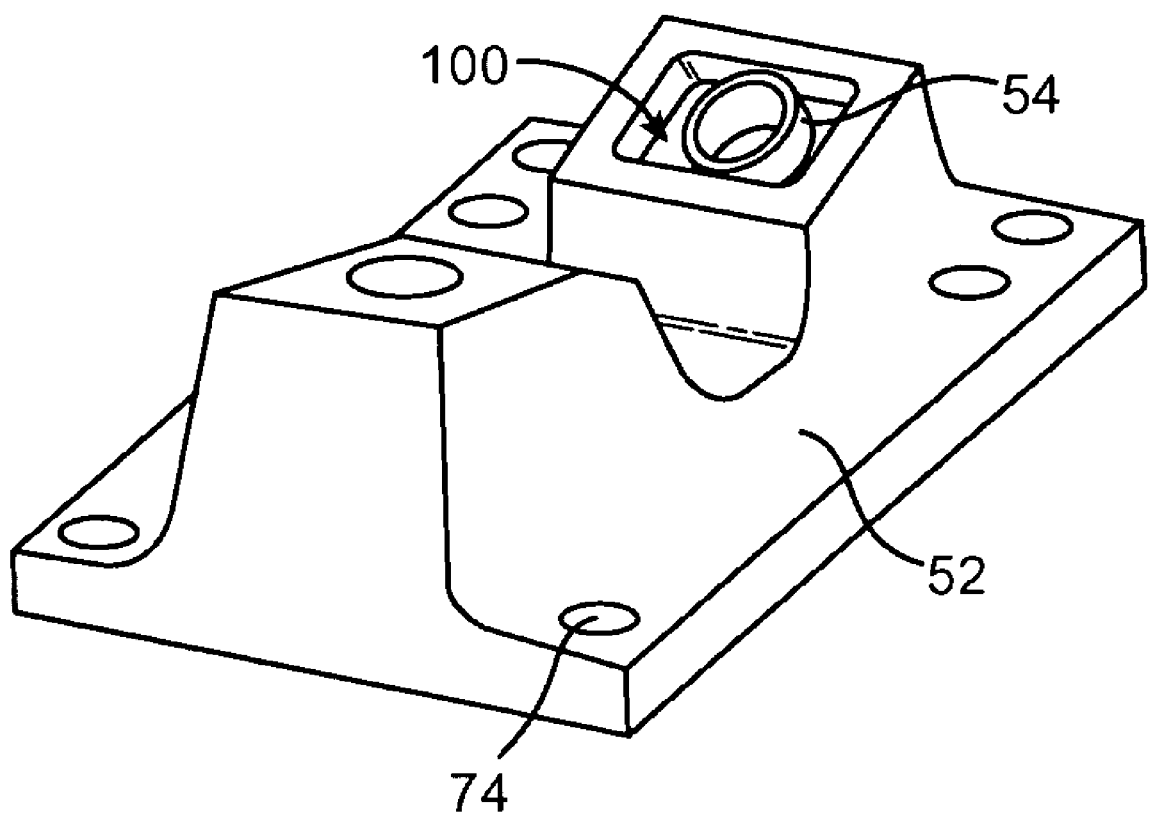
FIG. 7 shows a perspective view of a truck base plate having a moveable pivot cup.

As shown in FIG. 7, the actuating element 100 that creates differential motion between the truck 30 and deck 20 through the application of a lateral, transverse force across the deck of the skateboard can be fully integrated into the body of either the truck 30 or deck 20 or other skateboard parts. In FIG. 7 the pivot cup 54 on standard skateboard designs can be designed to move laterally within the truck base plate 52 to allow the enhanced turning response, which can also allow actuation of braking. At rest the pivot cup 54 is symmetrically centered relative to the base plate 52 and deviates laterally by a lateral force applied across the deck of the skateboard. The deviation of the pivot cup 54 from its centered resting position modifies the truck axle extensions 66 turning radius, beta ($\beta$), to beta-T ($\beta$-T). The pivot cup 54 returns to its symmetrically centered position within the base plate 52 when lateral forces applied across the deck of the skateboard are removed.

Additionally, kingpins 50, (as shown in FIG. 2) which are found internal to standard skateboard trucks 30, can be designed to allow fishtailing. Typically kingpins 50 are static components of skateboard trucks 30, which do not dynamically change while riding the skateboard 10. Standard static kingpins 50 can be tightened or loosened to compress or ease pressure on skateboard bushings 58, 70. The more pressure that a kingpin 50 places on the truck bushings 58, 70, the less responsive the turning angle, beta ($\beta$), of the trucks axle 66 to dips, theta ($\theta$), in the deck 20 of the skateboard 10.

The kingpin 50 can be a dynamically adjustable kingpin consisting of a hydraulic or pneumatic cylinder or mechanically dynamic elements, which ease or tighten pressure on the upper and bottom cushions 58, 70, in response to differential motion between the base plate 52 and the deck 20 of the skateboard 10 which is facilitated by an actuating element 100. The actuating element 100 transfers differential motion between the deck 20 and the truck 30 to the dynamically adjustable kingpin 50 which then enhances the turning angle, beta ($\beta$), of the trailing edge of the skateboard 10 so that a fishtailing action of the skateboard may result.

FIGS. 8–11 show a mechanical connection in the form of an actuating element 100, between the deck 20 and truck 30. The actuating element 100, can be designed to control the base plate 52 to rotate around and/or translate along lines parallel to lines L, P, or V (or any combination of these rotations and translations) in response to transverse or lateral forces across the deck of the board which are applied approximately perpendicular to the longitudinal axis of the skateboard deck 20. The preferred actuating force is the lateral force on the skateboard deck 20 created by pushing with the trailing leg approximately perpendicular to the longitudinal axis of the skateboard deck 20. It can be appreciated that many other means of actuating the rotation and/or translation of the base plate 52 from its resting position can be implemented. These other actuating forces include but are not limited to forces that are controlled by hands, feet or other body parts (remote controls, handle bars, foot pedals, etc.) or which are applied in directions other than approximately perpendicular to the longitudinal axis of the skateboard deck.

Figure 8A:
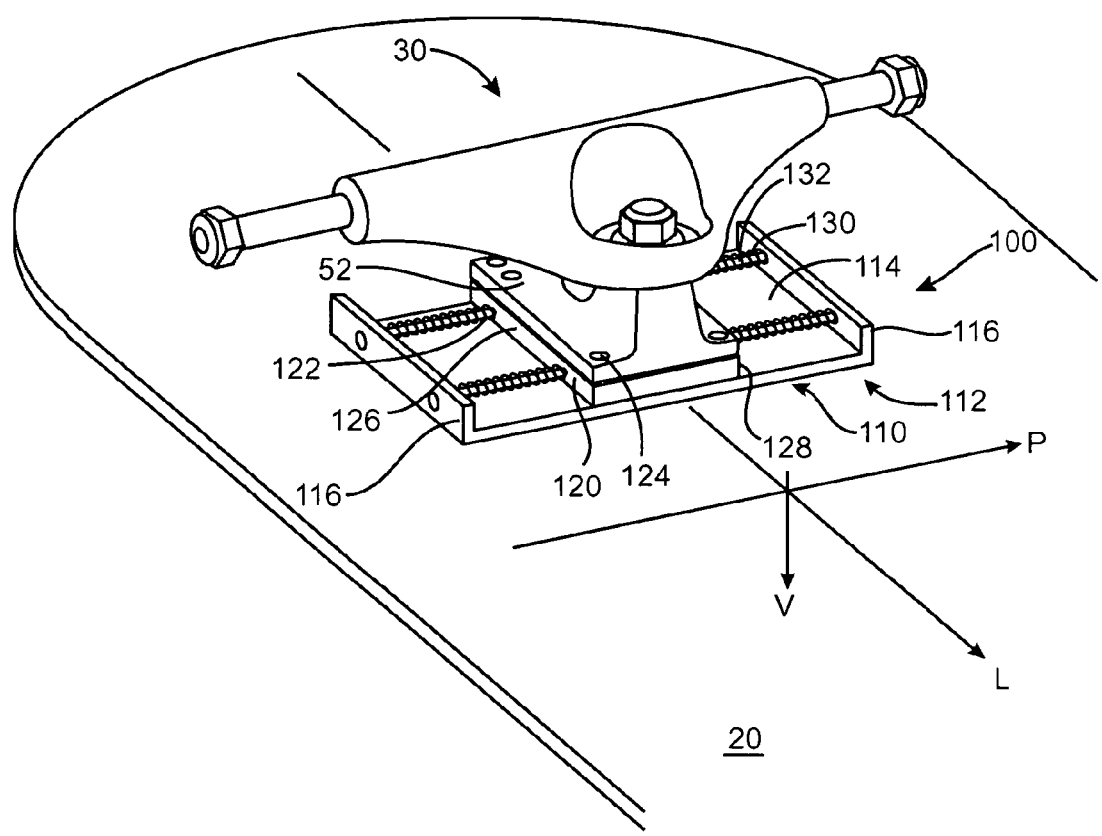
FIG. 8A shows a perspective view of a standard truck and an attached actuating element.

FIG. 8A shows a first embodiment of an actuating element 100. The actuating element 100 is positioned between the skateboard deck 20 and the base plate 52 of the truck 30. The actuating element 100 comprises a deck plate 110 and a truck plate 120. The deck plate 110 comprises a first side 112 and a second side 114. As shown in FIG. 8A, the deck plate 110 has a substantially flat surface on both the first side 112 and the second side 114. It can be appreciated that the first side 112 can adopt a shape which best fits the underside of the deck 20 to which the first side 112 is attached, which generally may not be flat, without deviating from this invention. On the second side 114 of the deck plate 110, the deck plate 110 comprises two edges 116 extending from the lateral ends of the deck plate 110. The deck plate 110 also includes a plurality of mounting holes 118 (not shown). The mounting holes 118 attach the actuating element 100 to the skateboard deck 20 and are hidden from view in FIG. 8A by the truck plate 120. The pattern or arrangement of the deck mounting holes 118 preferably matches the pre-drilled mounting holes on the base plate 52 of the truck 30. This way, the actuating element 100 can be optionally removed by the rider altogether such that the truck base plate 52 or the actuating element 100 can be mounted within the same holes on the deck 20 of the skateboard 10.

The truck plate 120 comprises a plurality of mounting holes 124 configured to attach the truck plate 120 to the truck 30. A pair of straight cylindrical holes 122 extends from a first edge 126 to a second edge 128 of the truck plate 120. A pair of cylindrical rods 132 extends from one edge 116 of the deck plate 110 to another edge 116 of the deck plate 110 passing through the cylindrical holes 122 of the truck plate 120. A plurality of springs 130 extend from the edges 116 of the deck plate 110 to the first and second edges 126, 128 of the truck plate 120. At rest the truck plate 120 is spring-centered relative to the deck plate 110 and deviates from its centered position (translation along a line parallel to line P) by a lateral force applied roughly perpendicular to the longitudinal axis of the skateboard deck 20 of the skateboard 10. Frictional force tends to prevent the wheels 40 from sliding sideways perpendicular to their plane of rotation while the lateral force applied by the rider, approximately perpendicular to the deck's 20 longitudinal axis, causes the actuating element 100 to shift from a first position to a second position. It can be appreciated that any suitable resistive device such a spring, a bushing, pneumatic, or hydraulic resistance or any other suitable device or material can be used to resist the motion of the truck plate 120 relative to the deck plate 110 without deviating from this invention.

The deviation of truck plate 120 from its spring-centered resting position does not modify the truck axle extensions 66 turning radius in this embodiment, but provides a means of actuating one of many yet-to-be-described braking systems and provides a subtle sensation of fishtailing due to the differential motion of the deck 20 relative to the truck 30. It can be appreciated that there are other mechanical means by which the actuating element can generate translation along lines parallel to the P axis as a result of a transverse or lateral force applied approximately perpendicular to the longitudinal axis of the skateboard deck 20 without deviating from this invention. The actuating element 100, or a subset of the components from which the actuating element 100 is comprised, which generates these alternative mechanical differential motions, may be integrated into the design of trucks 30 or decks 20, rather than in separate actuating elements 100 without deviating from this invention.

FIG. 8B shows an alternative embodiment of the actuating element 100 of FIG. 8A. As shown in FIG. 8B, the actuating element 100 comprises a deck plate 110 and a truck plate 120. The deck plate 110 comprises a first side 112 and a second side 114. As shown in FIG. 8A, the deck plate 110 has a substantially flat surface on both the first side 112 and the second side 114. It can be appreciated that the first side 112 can adopt a shape which best fits the underside of the deck 20 to which the first side 112 is attached, which generally may not be flat, without deviating from this invention. On the second side 114 of the deck plate 110, the deck plate 110 comprises two edges 116 extending from the lateral ends of the deck plate 110 and two edges 117 extending from the front and back ends of the deck plate 110. The front and back edges 117 each contain grooves 119 extending from the two lateral edges 116 of the deck plate 110. The deck plate also includes deck plate mounting holes 118.

The truck plate 120 is adapted to have its front and back edges 127, 129 fit within the grooves 117 of deck plate 110. Truck plate 120 comprises a plurality of mounting holes 124 through which the base plate 52 of the truck 30 is mounted to the actuating element 100. The truck plate 120 is free to slide within the grooves 117 of the deck plate 110 from a first position to a second position when a lateral force is applied roughly perpendicular to the longitudinal axis of the skateboard deck. It can be appreciated that the grooves 117 can be linear, curved, non-linear, convex, concave or any suitable shape without departing from the present invention. In addition, the grooves 117 can be positioned on the deck plate 110 rather than the truck plate without departing from the present invention.

Figure 8C:
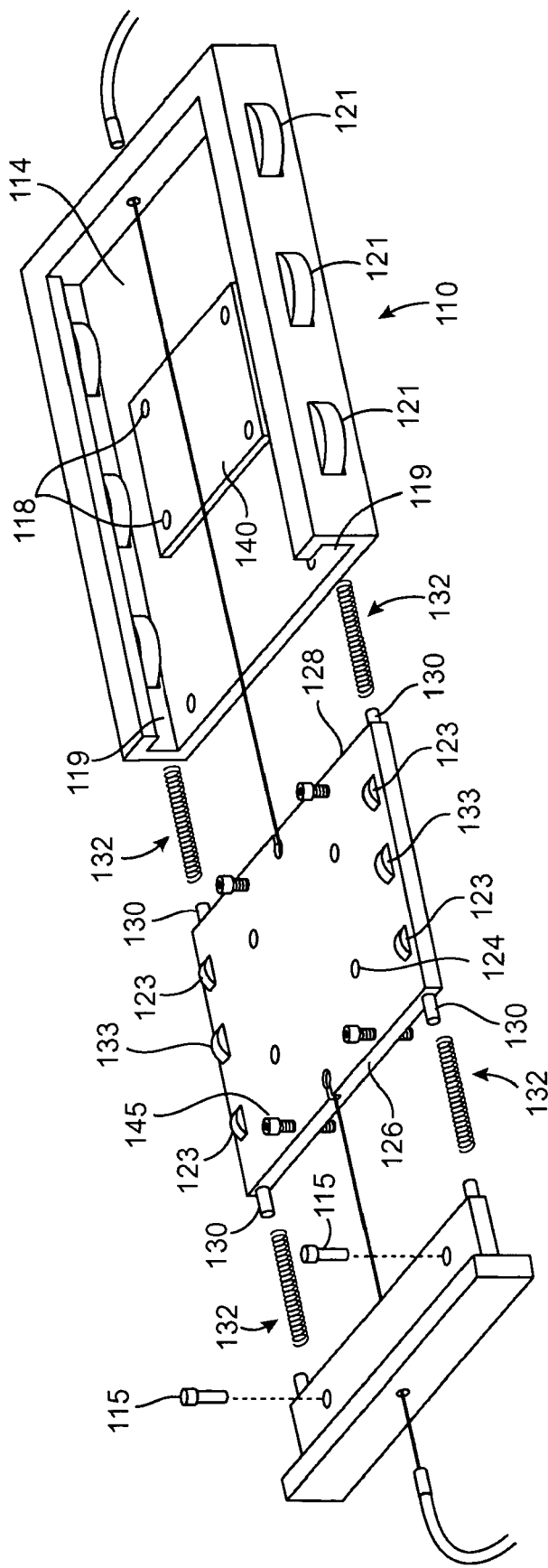
FIG. 8C shows a perspective view of an alternative embodiment of the actuating element of FIG. 8B.

FIG. 8C shows the actuating element of FIG. 8B with optional features. In this alternate embodiment, each of the side grooves 119 can also include at least one bearing roller wheel 121. The bearing roller wheel 121 is configured to assist with guiding the deck plate 120 as it deviates from a first position to a second position.

It can be appreciated that the truck plate 120 can also includes at least one roller wheel 123 to assist with the guiding of the truck plate 120 as it deviates from a first position to a second position. As shown in FIG. 8C, the at least one roller wheel 123 is configured to fit within the groove 117 of each of the side grooves 119.

It can be appreciated that the bearing roller wheels 121 and/or roller wheels 123, 133 can be ball bearings or any other suitable device to assist with the movement and relative positions of the deck and truck plates 110, 120.

A plurality of screws 115 can be used to attach the edges 116 to the deck plate 110. Alternatively, an adhesive, solder, or other suitable method can attach the two edges 116.

The actuating element shown in FIG. 8C may also comprise of a plurality of springs 132, which may be mounted and held in place on studs 130 attached to the lateral edges 126, 128 of the truck plate 120 and to the inner sides of lateral edges 116 of deck plate 110. The springs provide resistance to the movement of the truck plate 120 from a resting, spring-centered position to another position when a force is applied across the deck 20 of the skateboard 10 roughly perpendicular to the longitudinal axis of the deck 20. It can be appreciated that materials or devices, such as hydraulic or pneumatic cylinders or elastic bushings, or any other suitable device or material may be used in place of the springs without deviating from this invention.

The actuating element 100 in FIG. 8C may also be comprised of a raised surface 140 on the second side 114 of the deck plate 110, and a plurality of positive stops 145 which adjustably extend through truck plate 120. Adjustments made to the depth of the positive stops 145 on truck plate 120 can customize the behavior of the movement of the truck plate 120 relative to the deck plate 110. It may be desirable to only allow the actuation element 100 to move from a first position to a second position when the lateral force applied roughly perpendicular to the longitudinal axis of the skateboard deck 20 is directed away from the center of curvature of the skateboard's 10 path or to the outside of the turn.

Figure 8D:
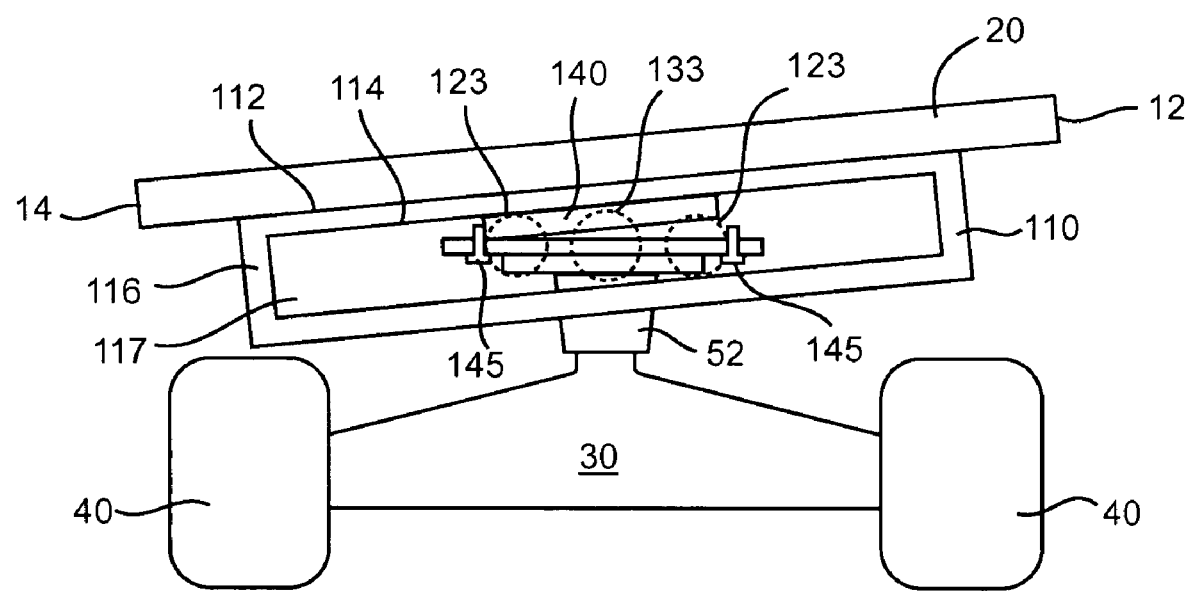
FIG. 8D shows an end view of the embodiment of the actuating element of FIG. 8C.

FIG. 8D shows an end view of the actuating element 100 of FIG. 8C. As shown in FIG. 8C the truck plate 120 may consist of a plurality of roller wheels 123 on the front end and back end of the truck plate 120. The roller wheel 133 located in the middle of the front and back edge of the truck plate 120 may be larger than the roller wheels 123 on lateral ends of the front and back edges of the truck plate 120. As the deck 20 is pressed downward on one lateral side 14 of the deck 20, the truck plate 120 rotates slightly around its longitudinal axis within the groove 117 of deck plate 110. The positive stops 145 can be adjusted such that the raised section 140 of the second side 114 of the deck plate 110 will come in contact with the positive stops 145 and prevent the displacement of the deck plate 110 relative to the truck plate 120 in a direction towards the center of curvature of the skateboard's 10 path. Activation of the actuating element 100 towards the center of curvature of the skateboard's 10 path would tend to straighten the path of the skateboard 10 and it may not be desirable to allow this inward displacement of the deck 20 relative to the truck 30. In this configuration the raised surface 140 on the second side 114 of the deck plate 110 will not come in contact with the positive stops 145 located on the edge of the truck plate 120, which is positioned towards the outer edge of the skateboard's 10 path. The deck plate 110 of the actuating element 100 will be free to move outward away from the center of curvature of the skateboard's 10 path, relative to the truck plate 120.

Figure 9:
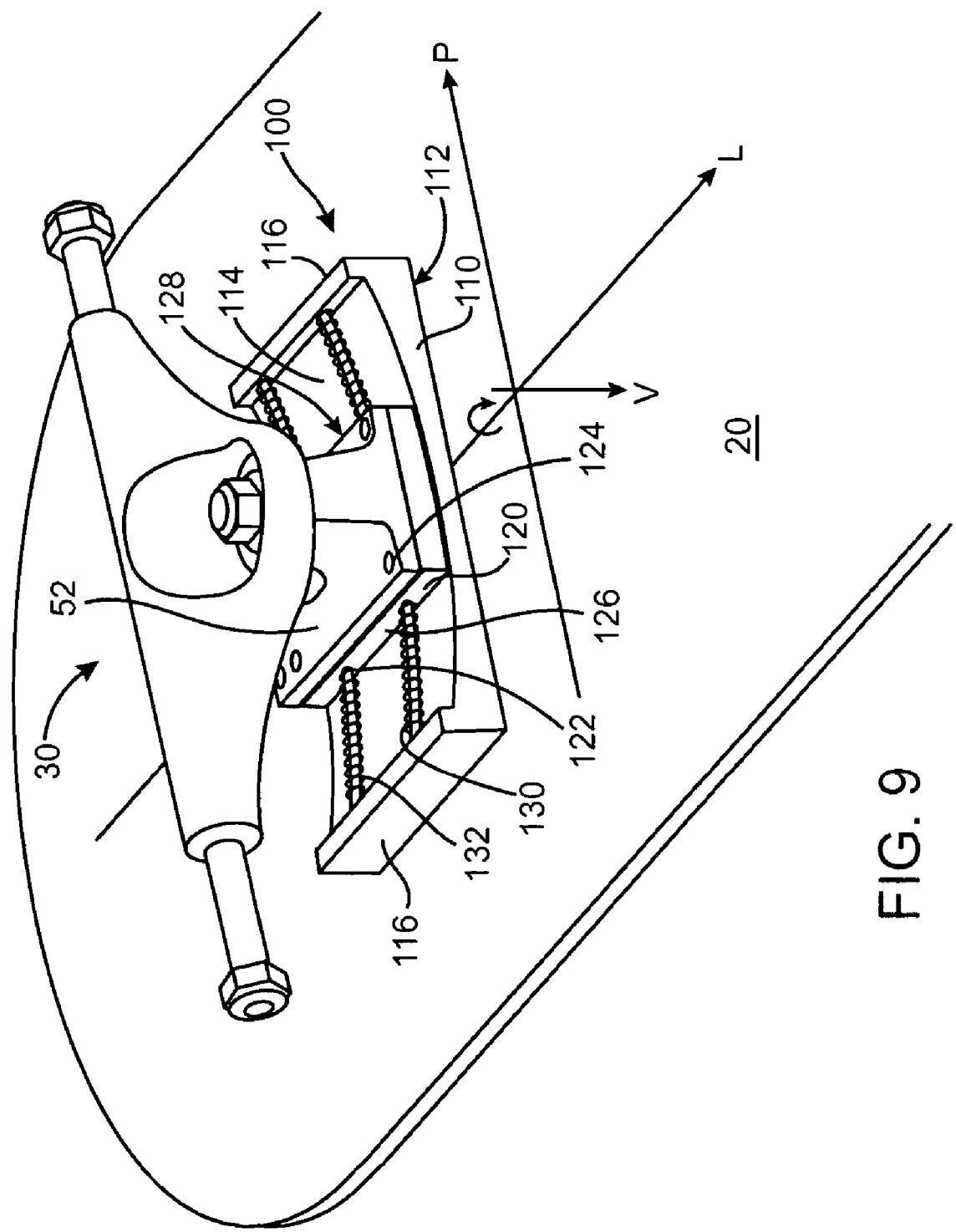
FIG. 9 shows a perspective view of another embodiment of a standard truck and an attached actuating element.

FIG. 9 shows an alternative embodiment of the actuating element 100. The embodiment in FIG. 9 is very similar to the embodiment shown in FIG. 8A. One fundamental difference between the two embodiments shown in FIG. 8A and FIG. 9 is that the rods 130 and holes 122 in the embodiment of FIG. 9 are curved. These curved elements modify the differential motion characteristics of the truck plate 120 relative to the deck plate 110. The actuating element 100 is positioned between the skateboard deck 20 and the base plate 52 of the truck 30.

As shown in FIG. 9, the actuating element 100 comprises a deck plate 110 and a truck plate 120. The deck plate 110 has a first side 112 and a second side 114. The first side 112 is adapted to be attached to the skateboard deck 20. A pair of curved openings 122 extends from a first edge 126 to a second edge 128 of the truck plate 120. A pair of similarly curved rods 132 extends from one edge 116 of the deck plate 110 to another edge 116 of the deck plate 110 and pass through the curved openings 122. The second side 114 of the deck plate has a curved surface. A plurality of springs 130 extend from the edges 116 of the deck plate 110 to the first and second edges 126, 128 of the truck plate 120. At rest the truck plate 120 is spring-centered relative to the deck plate 110 and deviates laterally in an arched path (rotation around an axis parallel to line L) by a transverse or lateral force applied roughly perpendicular to the longitudinal axis of the skateboard deck 20. The deviation of truck plate 120 from its spring-centered resting position modifies the truck axle extensions 66 turning radius, beta ($\beta$), to beta-T ($\beta$-T) for any given deck dipping angle, theta ($\theta$) (FIGS. 3 and 5). It can be appreciated that there are other mechanical means by which rotation around an axis parallel to line L can be achieved without deviating from this invention. The actuating element 100, which generates these alternative mechanical differential motions, can be integrated into the design of trucks 30 or decks 20, rather than in separate actuating elements 100 without deviating from this invention.

It can be appreciated that alternative embodiments analogous to FIGS. 8B, 8C, and 8D which instead include curved or non-linear grooves 117 and other non-linear elements can easily be adapted to achieve the goal of the embodiment in FIG. 9 without deviating from this invention.

It can be appreciated that actuating elements can be designed to have many simple or complex combinations of rotations around, and translations along, the three (3) orthogonal axes, L, P, and V without deviating from this invention. The actuating element 100 or its component parts, which generates these alternative mechanical differential motions, can be integrated into the design of trucks 30 or decks 20, rather than in separate actuating elements 100 without deviating from this invention.

Figure 10A:
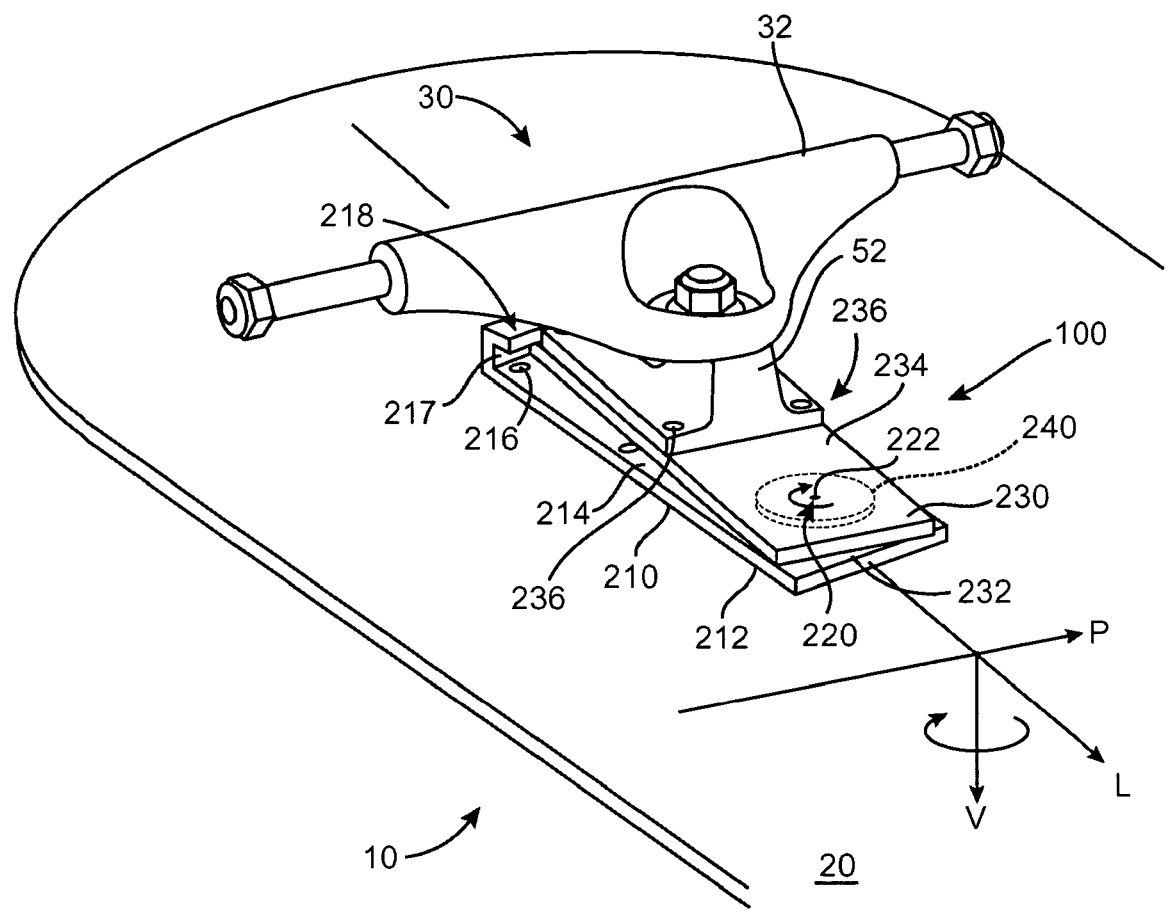
FIG. 10A shows a perspective view of a further embodiment of a standard truck and an attached actuating element.

FIG. 10A shows a further embodiment of an actuating element 100. The actuating element 100 is positioned between the skateboard deck 20 and the base plate 52 of the truck 30. The actuating element 100 is preferably positioned on the trailing truck 34 of the deck 20 of the skateboard 10 but can also be mounted on the leading truck 32 or both the leading 32 and trailing trucks 34 of the skateboard 10.

As shown in FIG. 10A, the actuating element 100 comprises a deck plate 210 and a truck plate 230. The deck plate 210 comprises a first side 212 adapted to attach to the deck 20 of the skateboard 10 and a second side 214, which faces and connects to the truck plate 230. The first side 212 is preferably a smooth or flat surface, or is otherwise configured to attach to the bottom side 24 of the deck 20. The deck plate 210 has a plurality of deck mounting holes 216. The pattern or arrangement of the deck mounting holes 216 preferably matches the pre-drilled mounting holes on the base plate 52 of the truck 30. This way, the actuating element 100 can be optionally removed by the rider altogether such that the truck base plate 52 or the actuating element 100 can be mounted within the same holes on the deck 20 of the skateboard 10. The second side 214 of the deck plate 210 includes an edge 218 with a groove 217. The groove 217 is configure to accept the end of the truck plate 230 and is intended to prevent the separation of the deck plate 210 and the truck plate 230 in a direction perpendicular to the sides of these plates 210, 230 which face one another. The deck plate 210 and the truck plate 230 are also attachable to one another at a pivoting mechanism 220. The pivoting mechanism 220 preferably contains elements 240 which provide resistive forces, which tend to resist the two plates 210, 230 from pivoting around a central pivot point 222 around the V axis. It can be appreciated that any suitable resistive device such a spring, a bushing, pneumatic or hydraulic resistance or any other suitable resistive element can be used within the pivoting mechanism 220 without deviation from this invention.

The truck plate 230 comprises an end configured to slide within the edge 218 and groove 217 on the deck plate 210. The edge 218 and groove 217 guide the truck plate 230 over the deck plate 210 and prevent the plates 210, 230 from separating from each other except in a controlled rotation around the pivot point 222. The deck plate 210 is preferably secured to the deck 20 of the skateboard 10 with bolts or screws through mounting holes 216. The location and configuration of the edge 218 and groove 217 on the deck plate 210 and suitable adapted elements on the truck plate 230 can take many other forms without deviating from this invention. The truck plate 230 further comprises a plurality of mounting holes 236 configured to receive an equal number of nuts and bolts from the base plate 52 of the truck 30.

At rest the deck plate 210 and truck plate 230 of the actuating element 100 are aligned such that the longitudinal axes of the plates 210, 230 are coincident with one another and the axle extensions 66 of the truck 30 is perpendicular to the longitudinal axis of the skateboard deck 20. Lateral or transverse forces across the deck 20 of the skateboard 10, which are applied approximately perpendicular to the longitudinal axis of the skateboard deck 20, cause the deck plate 210 and truck plate 230 to rotate around an axis parallel to line V and through the pivot point 222 against the rotational resistive element 240. The angles by which the two plates 210 and 230 depart from their resting positions enhance the turn angle, beta, of the trucks axle 66 from beta to beta-T (β-T). It can be appreciated that there are other mechanical means by which an actuating element 100 can allow rotation of the base plate 52 relative to the skateboard deck 30 around a line parallel to line V without deviating from this invention.

Figure 10B:
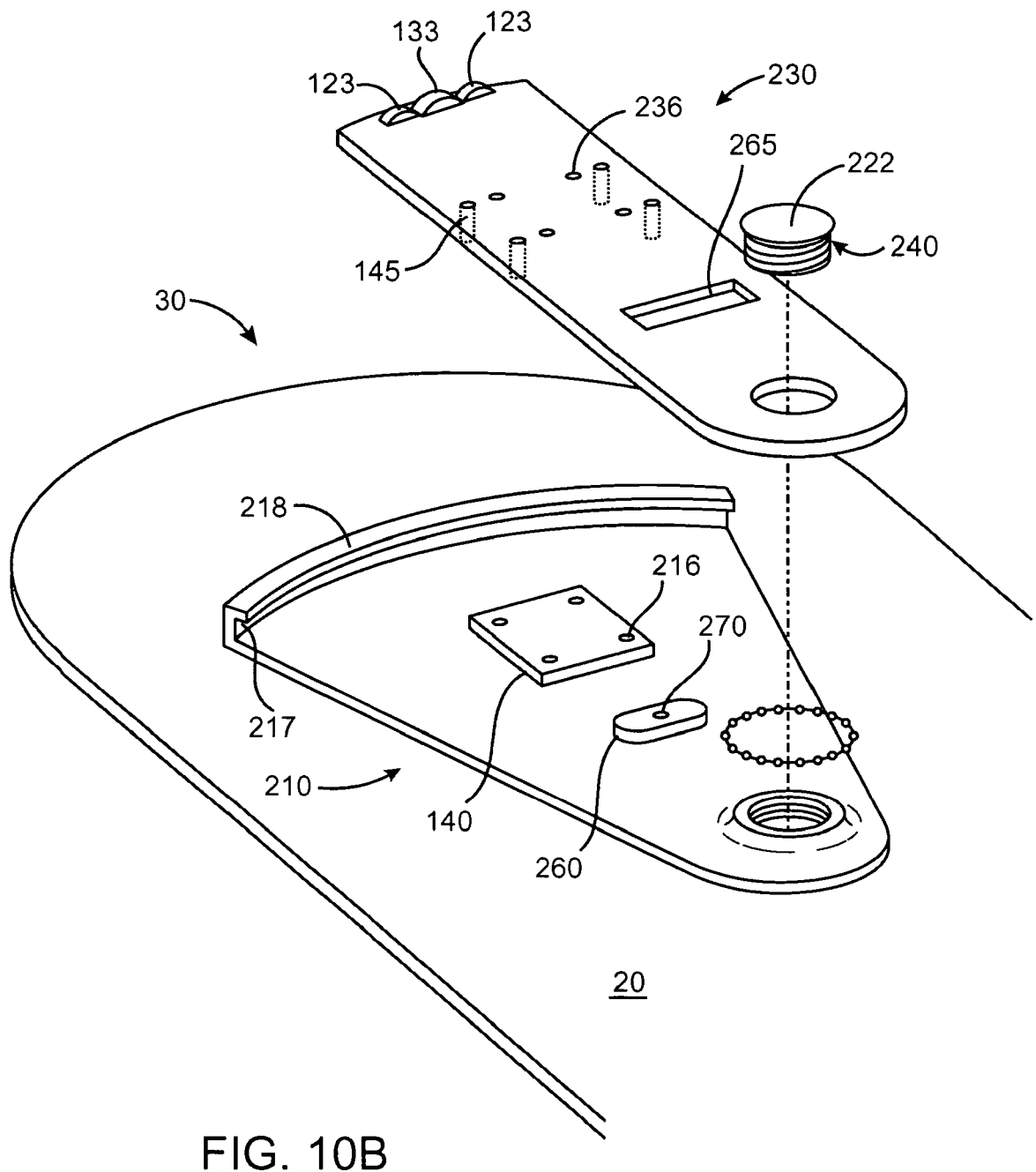
FIG. 10B shows a perspective view of a further embodiment of the actuating element of FIG. 10A.

FIG. 10B shows an exploded perspective view of an alternative embodiment of the actuating element 100 shown in FIG. 10A. This embodiment includes several optional elements, which enhance the function of the actuating element 100 shown in FIG. 10A. One or more wheel roller bearings 123, 133 may be added to the truck plate 230. The wheel roller bearings 123 may help guide the end of the truck plate 230 within the groove 217 on the deck plate. Adjustable Positive stops 145 may be added to the truck plate 230 and are adapted to perform the same function as described in the sections above referring to FIGS. 8C and 8D. The deck plate 210 may have a raised surface 140. The deck plate 210 may also have a bushing 260 held in place by a screw 270 or other appropriate element. A matching opening 265 in the truck plate would be adapted to receive the flexible bushing 260. Analogous to the description for FIGS. 8C and 8D, the wheel roller bearings 123, 127 may be sized and positioned, and the positive stops can be adjusted relative to the raised section 140 on deck plate 210, such that the displacement of the deck plate 210 relative to the truck plate 230 may only be allowed towards the outer side of the curved skateboard 10 path. Subtle rotation of the truck plate 230 within the groove 217 of the deck plate 210 will require that sufficient torsion flexibility be allowed around the longitudinal axis of the truck plate 230. The flexible bushing 260 may provide the resistance to the rotation of the truck plate 230 relative to the deck plate 210 around the V axis at pivot point 222.

Figure 11:
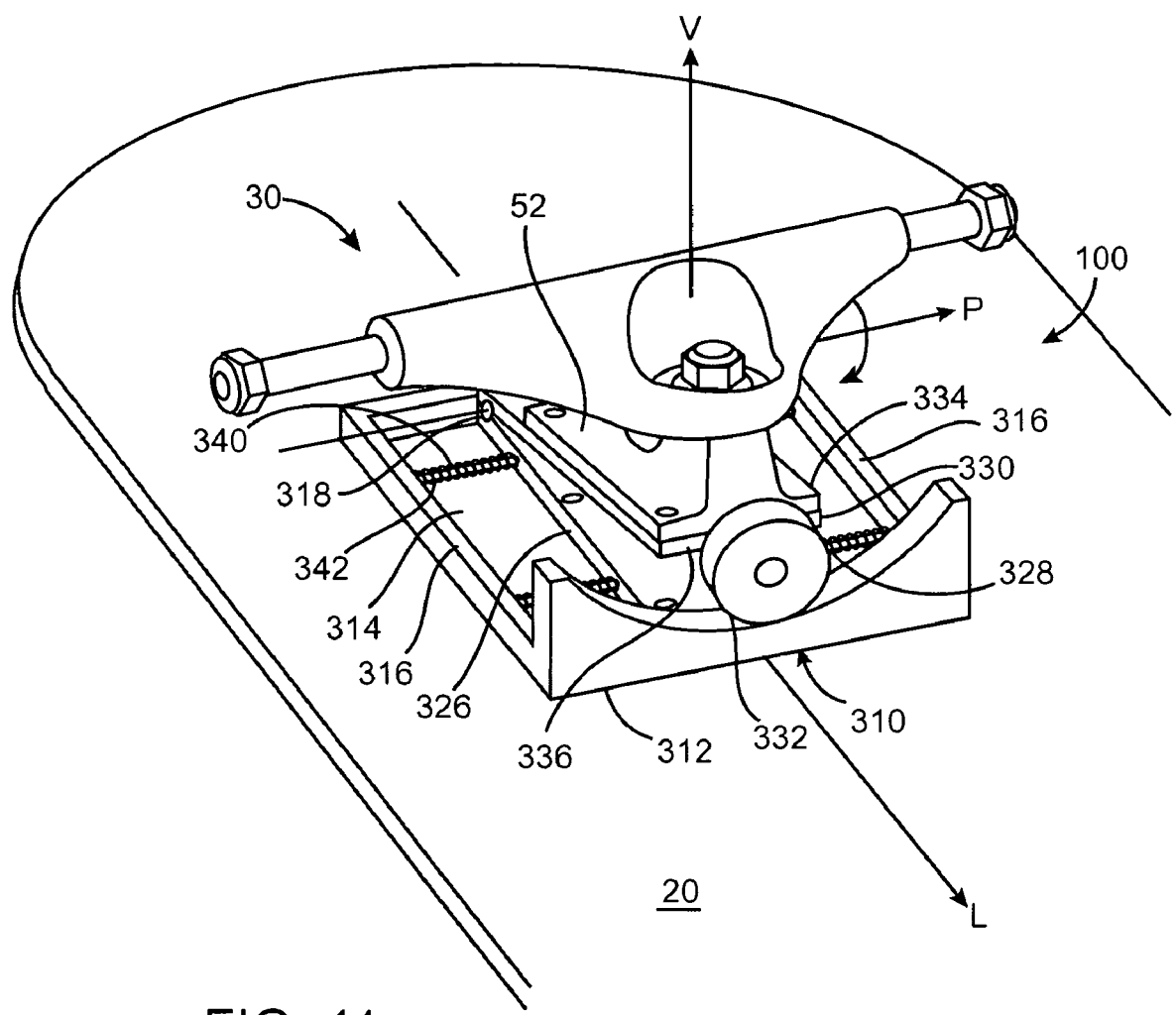
FIG. 11 shows a perspective view of an alternative embodiment of an actuating element.

FIG. 11 shows an alternative embodiment of an actuating element 100. This actuating element 100 illustrates how rotation of the base plate 52 relative to the deck 20 around an axis parallel to the line P can facilitate an enhanced turning response or fishtailing. As shown in FIG. 11, the actuating element 100 comprises a deck plate 310 and a truck plate 330. The deck plate 310 comprises a first side 312 and a second side 314. The first side 312 is adapted to be attachable to the underside of the skateboard deck 20. The deck plate 310 has a plurality of mounting holes (not shown) configured to secure the deck plate 310 to the deck. The mounting holes are configured to match the mounting holes of the skateboard deck 20.

The truck plate 330 comprises a first truck plate 332 and a second truck plate 334. A hinge 318, which resists rotation, attaches the first and second truck plates 332, 334 to one another. The hinge 318 attaches the first truck plate 332 and the second truck plate 334 towards an end of the skateboard 10 away from the middle of the skateboard 10. However, it can be appreciated that any suitable connective device can be used to connect the first truck plate 332 and the second truck plate 334 to one another, such that the truck 30 and deck 20 have relative differential motion in the form of rotation around a line parallel to the line P. Preferably, the connective device provides some resistance to movement away from the resting position.

The first truck plate 332 deviates laterally from the deck plate 310 on a pair of curved rod 342 and a plurality springs 340. The second truck plate 334 attaches to the base plate 52 of the skateboard truck 30 via a plurality of mounting holes 336. The pair of curved openings 322 extends from a first edge 326 to a second edge 328 of the first truck plate 332. A pair of similarly curved rods 342 extends from one edge 316 of the deck plate 310 to another edge 316 of the deck plate 310 and pass through the curved openings 322.

A plurality of springs 340 extend from the edges 316 of the deck plate 310 to the first and second edges 326, 328 of the truck plate 330. At rest the truck plate 330 is spring-centered relative to the deck plate 310 and deviates laterally in an arched path (rotation around an axis parallel to line L) by a transverse or lateral force applied roughly perpendicular to the longitudinal axis of the skateboard deck 20. The deviation of truck plate 330 from its spring-centered resting position modifies the truck axle extensions 66 turning radius, beta ($\beta$), to beta-T ($\beta$-T) for any given deck dipping angle, theta ($\theta$) (FIGS. 3 and 5). It can be appreciated that there are other mechanical means by which rotation around an axis parallel to line L can be achieved without deviating from this invention. The actuating element 100, which generates these alternative mechanical differential motions, can be integrated into the design of trucks 30 or decks 20, rather than in separate actuating elements 100 without deviating from this invention.

At rest the first and second truck plates 332, 334 are coincident with one another and are caused to pivot about the hinge 318 by a transverse or lateral force applied across the deck 20 of the skateboard 10 in a direction roughly perpendicular to the longitudinal axis of the deck 20. The angles by which the first and second truck plates 332, 334 depart from their resting positions enhance the turning angle of the trucks' axle extensions 66 from beta to beta-T ($\beta$-T). In this embodiment, which utilizes rotation around an axis parallel to line P, another mechanical element, such as that shown in FIG. 8, may be required to convert the transverse force directed approximately perpendicular to the longitudinal axis of the deck 20 into the rotation around the axis parallel to line P. It can be appreciated that there are other mechanical means by which rotation can be achieved around an axis parallel to line P without deviating from this invention.

Figure 12:
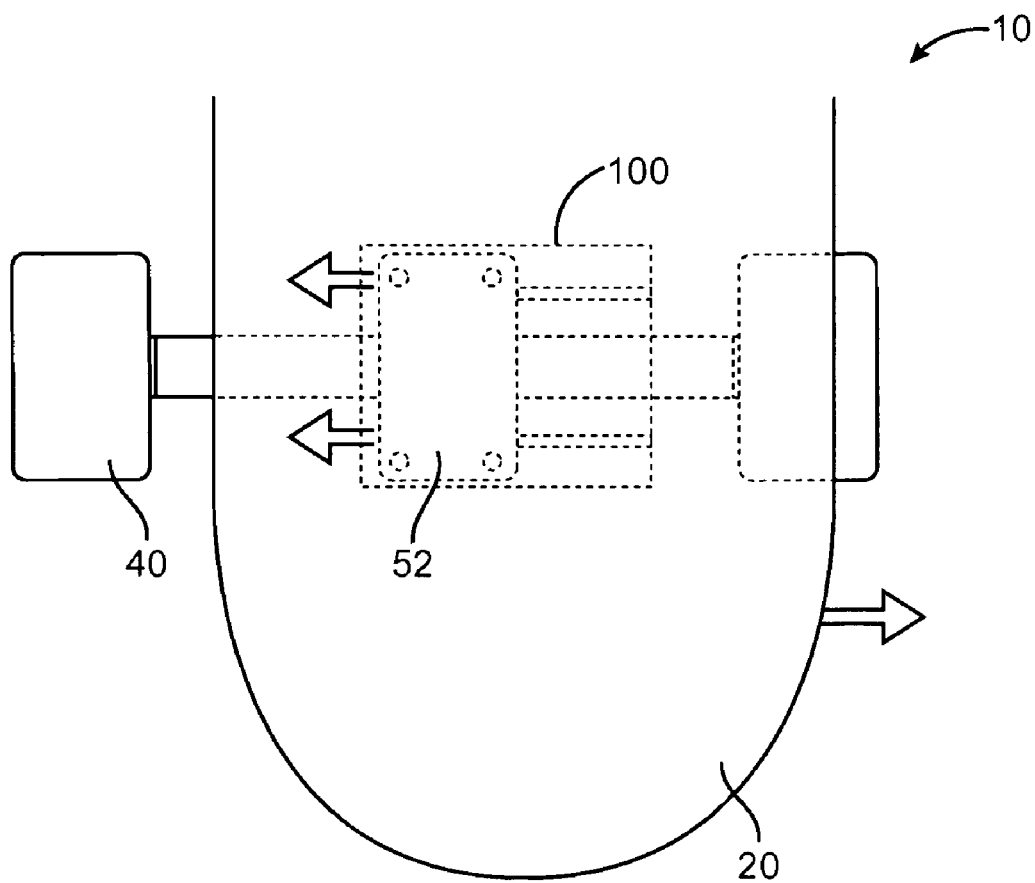
FIG. 12 shows a top view of a skateboard deck illustrating a lateral force motion upon an actuating element
Figure 13:
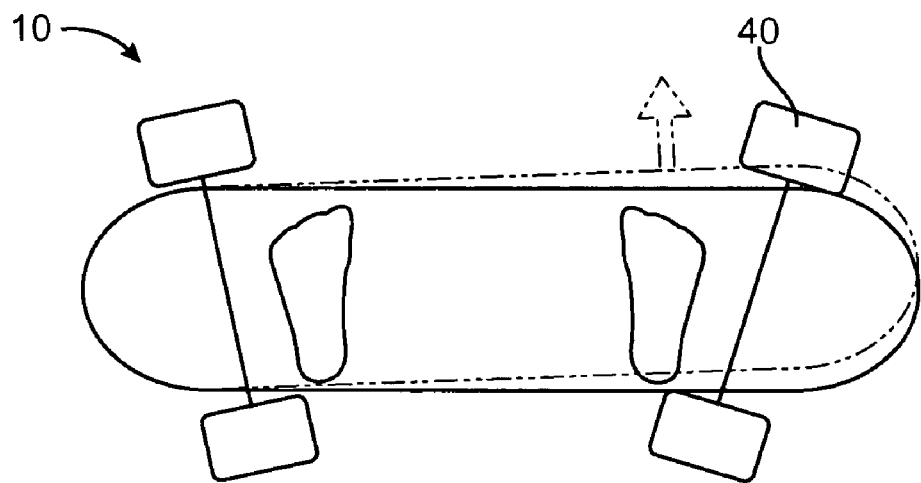
FIG. 13 shows a top view of a skateboard illustrating the lateral force motion of FIG. 12.

FIG. 12 shows a top view of a skateboard deck 20 illustrating a lateral force motion upon an actuating element 100. FIG. 13 shows a top view of a skateboard 10 illustrating the lateral force motion of FIG. 12.

Braking Action

Braking action in this invention is achieved by transferring the differential motion between the deck 20 and truck 30 generated by the actuating element 100, as shown in FIGS. 5 through 11 into another mechanical motion to slow or stop the motion of the skateboard. It is not required that the actuating element 100 also generates a significant fishtailing response or otherwise enhance the steering of the board in order to achieve braking. It can be appreciated that there are many mechanical means by which the actuating element 100 can produce the differential motion (any combination of translation along, or rotation around, lines parallel to 3 orthogonal axes L, P, and V) between the deck 20 and the truck 30, which result from the lateral or transverse force applied to the deck 20 of the skateboard 10 roughly perpendicular to the longitudinal axis of the skateboard deck 20, without deviating from this invention.

Likewise, there are many mechanical means by which rotating elements of the skateboard (wheels 40, axle extensions 66, bearings, etc.), involved in the movement of the skateboard 10 across the ground, can be mechanically slowed or stopped by a braking system 400, which includes the actuating element 100. The scope of this invention includes all combinations of the various mechanical braking elements coupled with the actuating elements techniques described herein.

Figure 14:
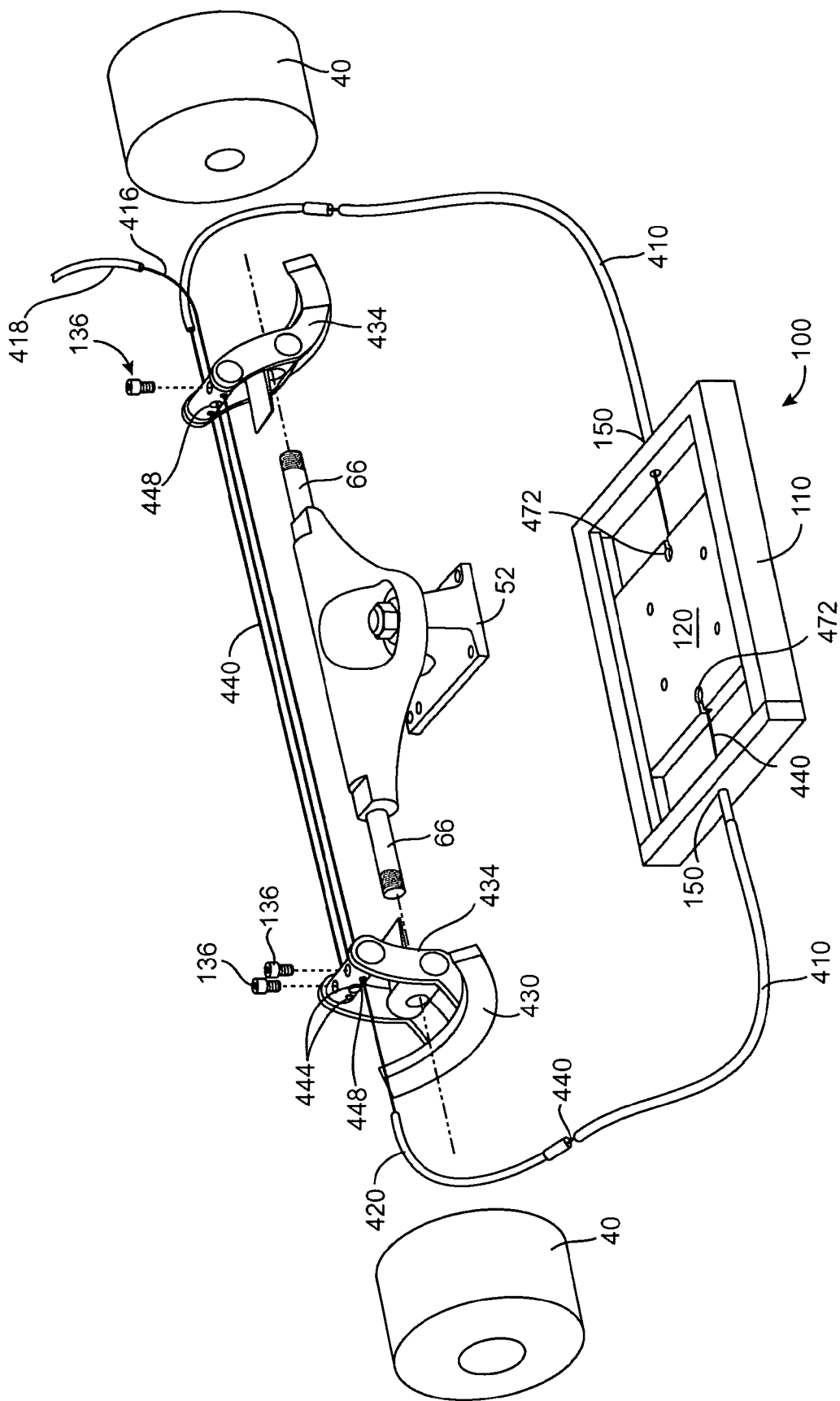
FIG. 14 shows a perspective view of an embodiment of a braking system and actuating element.

FIG. 14 provides an example of the means by which the actuating element 100 can be coupled with a braking system 400 to achieve braking, but by no means are these examples intended to limit the range and scope of this invention to only those examples shown.

FIG. 14 shows a perspective view of a braking system 400 comprising an actuating element 100. In this example, the actuating element 100 is that one shown in FIG. 8C. The actuating element 100 comprises a deck plate 110 and a truck plate 120. The deck plate 110 comprises a first side 112 and a second side 114. The deck plate 110 also includes a plurality of mounting holes 118. The mounting holes 118 attach the actuating element 100 to the skateboard deck 20. The truck plate 120 comprises a first side 112 and a second side 114. The truck plate 120 also includes a plurality of mounting holes 124. The mounting holes 124 attach the actuating element 100 to the truck 30.

As shown in FIG. 14, the braking system 400 comprises brake pads 430, caliper arms 434, a hand-actuated brake cable 416 and two actuator cables 440. The hand-actuated cable 416 is pulled by a hand-actuated braking system (not shown) similar to that found on many popular bicycles. The two additional actuator cables 440 physically and functionally connect the actuating element 100 to the braking system 400. The two actuator cables 440 mounts to the truck plate 120 at truck plate anchors 472 and to the two caliper arms 434 at the caliper arm anchors 136. At all other points along the path of the two actuator cables 440 between the truck plate anchors 472 and the caliper arm anchors 136, the two actuator cables 440 slide freely within deck plate anchors 150, a flexible cable sheaths 410, rigid sheath tubing 420 and all other elements through which the actuator cables 440 pass.

One end of the flexible cable sheathes 410 are seated within the cable sheath anchors 150 which are openings within the deck plate 110. The other end of each flexible cable sheath 410 is seated within one end of each of the two curved rigid sheath tubes 420 at sheath seats 448. The other end of each rigid sheath tube 420 seats within a connection point 444 on one caliper arms 434. Differential motion between the deck plate 110 and the truck plate 120 in one direction causes one of the two actuator cables 440 to pull the cable-anchored ends of the caliper arms 434 towards one another, thereby forcing the brake pads 430 to come in contact with the wheels 40, thereby slowing or stopping the wheels 40. The second of the two actuator cables 440 and the hand actuated brake cable 416 will slacken when the first of the two actuator cables 440 is actuated by the differential motion of the actuating element 100. The hand actuated brake cable 416 and system is an optional item that can be included in the braking system 400 while the rider learns to use the braking system 400 actuated by the actuating element 100. Once the rider is comfortable with the operation of the braking system 400 actuated by the actuating element 100, the rider can optionally remove the hand actuated braking cable 416 and system.

As shown in FIG. 14, the cable sheath 410, 418 is preferably comprised of a semi rigid material such as plastic and allows the free movement of the cables 440, which slide within. The curved tubes 420 are preferably comprised of a rigid material, such as a metal or hard plastic (e.g., polyvinyl chloride (PVC)) however, it can be appreciated that the cable sheath 410, 418 or rigid tubes 420 can be encased in any suitable material.

It can be appreciated that the transfer of differential motion within the actuating element 100 in FIG. 14 to the braking system 400 can be accomplished with cables, pneumatics, hydraulics, and a variety of other mechanical means of putting the rotating elements (wheels 40, axle extensions 66, bearings, etc.) in contact with the braking system 400 without deviating from this invention.

The preferred embodiment of this invention is an actuating element 100 and braking system 400 independent of all other standard skateboarding elements (deck 20, trucks 30, wheels 40, etc.) but it can be appreciated that the actuating, fishtailing, and braking elements of this invention resulting from the differential motion between the deck and truck (which is derived from the lateral force across the deck) can be fully integrated into the design of other skateboarding elements (trucks 30, decks 20, axle extensions 66, wheels 40, bearings, etc.) without deviating from the scope of this invention. In the preferred embodiment, none of the standard decks 20, trucks 30, bearings, or wheels 40 need to be modified in any way. The actuating element 100 and braking system 400 are attached to the rider's favorite deck 20 through the standard 4-hole truck 30 mounting pattern or any other necessary mounting configuration between truck 30 designs and deck 20 designs. It can be appreciated that the subject actuating elements 100 and braking systems 400 can be adapted to unique truck 30 systems other than the truck as shown in FIG. 2. Adjustments to the positioning of the braking system 400 which come in contact with rotating parts (wheels 40, axle extensions 66, bearings, etc.) will be required and will be a function of the design and size of the truck 30, deck 20, and wheels 40 and the rider's preferences.

Figure 15:
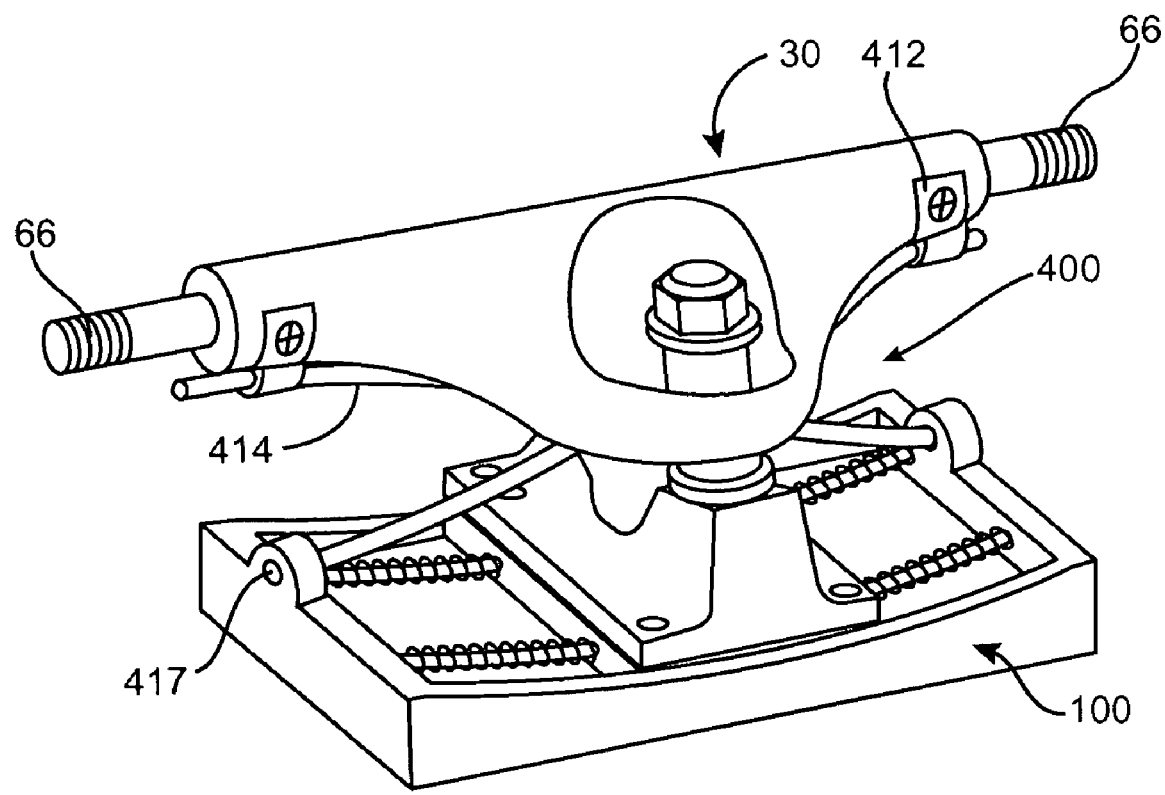
FIG. 15 shows a perspective view of a braking system including the actuating element.

FIG. 15 shows a perspective view of another braking system 400. The braking system 400 comprises an actuating element 100 (as described in FIG. 9), a brake filament 414, and a bracket mounting 412. Any actuating element 100 as shown in FIGS. 8–11 or any other mechanical means of generating differential motion between the deck and truck as a result of lateral or transverse forces applied to the deck of a skateboard can be designed to mechanically function with the braking system 400 as described herein without deviating from this invention. The bracket mounting 412 either fits over both ends of the truck axle extensions 66 (not shown in FIG. 15) and/or is attached to the truck hanger 68. The brake filament 414 can be made from a flexible and/or elastic material such as plastic or firm rubber and is attached at one end to the deck plate 110 at brake filament connection point 417. The brake filament 410 is designed to freely slide through an opening in the bracket mounting 412. Differential motion between the deck plate 110 and the truck plate 120 is transferred to differential motion between the brake filament 410 and the bracket mounting 412 such that the brake filament 410 will come in contact with a rotating elements such as a skateboard wheel 40 and tend to slow or stop the motion of the skateboard 10.

Figure 16:
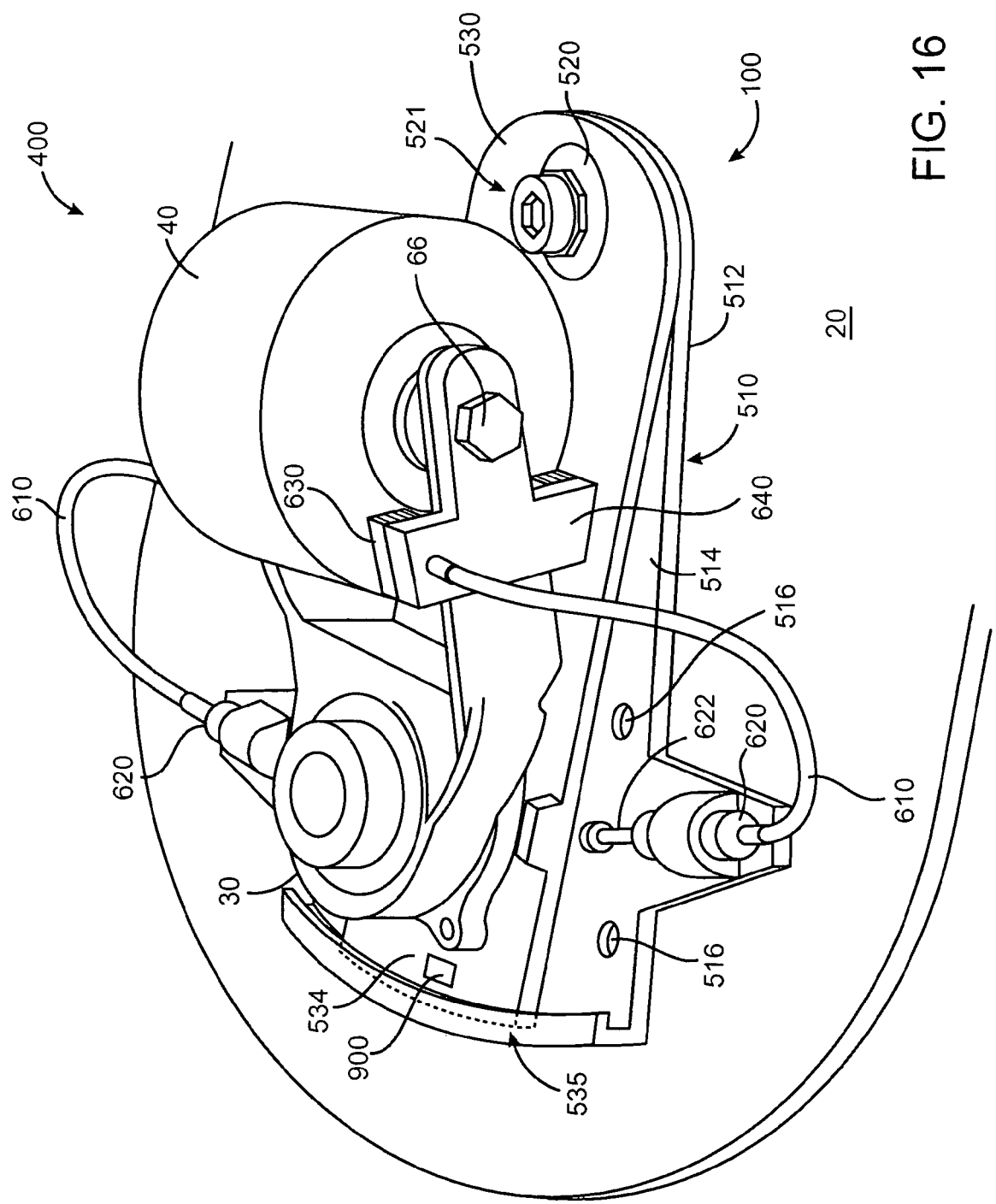
FIG. 16 shows a perspective view of another embodiment of a braking system including the actuating element.

FIG. 16 shows a braking system 400 attached to an actuating element 100. As shown in FIG. 16, the actuating element 100 is positioned between the skateboard deck 20 and the truck 30. The actuating element 100 is the one shown and described in FIG. 10. The truck 30 in this embodiment is of a design by Tierney Rides. The actuating element 100 is preferably position on the trailing truck of the deck 20 of the skateboard 10. However, it can be appreciated that the actuating element 100 can be mounted on the leading truck or the leading and trailing trucks.

As shown in FIG. 16, the actuating element 100 comprises a deck plate 510 and a truck plate 530. The deck plate 510 comprises a first side 512 adapted to attach to the deck 20 of the skateboard 10 and a second side 514. The first side 512 is preferably a smooth or flat surface, which is configured to be attachable to the bottom side of the deck 20. The deck plate 510 has a plurality of deck mounting holes 516. The deck mounting holes 516 preferably match the mounting hole pattern on the truck 30 such that either the truck 30 or the actuating element 100 can be mounted directly to the deck 20 within the same mounting pattern.

The deck plate 510 and the truck plate 530 are attachable to one another by a mechanical pivot connection 520. As shown in FIGS. 10A, 10B and 16, the mechanical pivot connection 520 preferably contains a resistive mechanisms 540 that tend to resist the rotation of the deck plate 510 and the truck plate 530 relative to one another around an axis perpendicular (parallel to the line V) to the flat sides of both plates 510, 530 which face one another. It can be appreciated that any mechanical pivot connection 520 can be used without deviating from this invention. As shown in FIG. 16, the pivot connection 520 comprises an adjustable resistive pivot 521 perhaps consisting of a torsion spring (not shown).

The truck plate 530 comprises a first side 532 and a second side 534. The first side 532 of the truck plate 530 further includes a groove system 217 configured to maintain the positioning of the deck and truck plates 510, 530. This groove system 217 has the same function as in FIG. 11.

The braking system 400 comprises two flexible pneumatic or hydraulic feed lines 610, two pneumatic or hydraulic cylinders 620 two brake pads 630 and two brake pad mounting brackets 640. The brake pad mounting brackets 640 attach to the truck axle assembly 66. The feed lines 610 and cylinders 620 preferably comprise a pneumatic material or hydraulic fluid. The pneumatic or hydraulic cylinders 620 each preferably contain an internal spring (not shown) and a piston rod 622. The force of the spring tends to push the piston rod 622 out of each cylinder 620. Differential motion of plate 530 relative to plate 510 on the actuator element 100 tends to force the piston 622 into one of the two cylinders 620 against the force of the spring internal to that cylinder 620. The pneumatic or hydraulic material within the cylinder 620 is driven by the displaced piston 622 through the feed line 610 towards the brake pad 630. The pneumatic or hydraulic pressure forces the brake pad to extend from feed line 610 and contact the wheel 40, which tends to slow or stop the rotation of the wheel 40.

It can be appreciated that any of the braking pads 430 (FIG. 14) and 630 (FIG. 16) as shown in the braking systems 400 of FIGS. 14–16 can be replaced with a braking member configured to apply a force against a portion of a wheel or any other rotating element involved in the locomotion of the skateboard or wheeled platform (e.g., an axle rather than the wheel when the wheel is rigidly attached to a rotating axle including a hydraulic powered skateboard as shown in U.S. patent application Ser. No. 10/874,134, filed Jun. 21, 2004), such that contact between the braking member and the rotating element reduces or tends to slow or stop the rotational velocity of the rotating element. In addition, the braking member can be a disc brake, a drum brake or power brake system without deviating from this invention.

Figure 17:
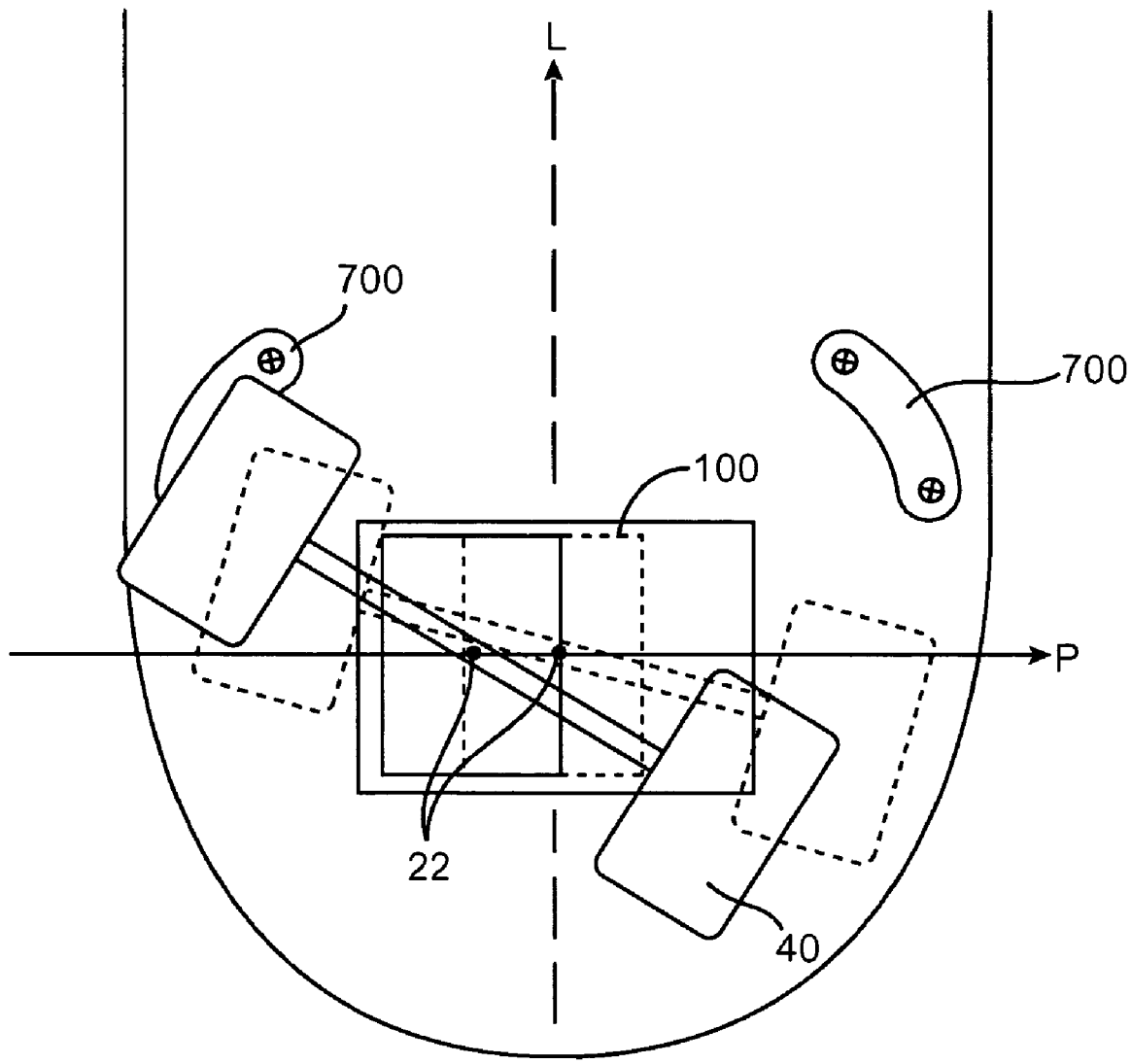
FIG. 17 shows a bottom view of a skateboard with both an actuating element and static braking pads.

FIG. 17 shows a bottom view of a skateboard deck 20, an actuating element 100 and stationary braking pads 700. The braking pads 700 are preferably a semi-rigid or semi-flexible material with elastic properties such that they will return to their original shape after being temporarily deformed while the wheels come in contact with the pads 700. The braking pads 700 are attached to underside of the deck 20 of the skateboard 10. In operation, when sufficient lateral or transverse force is applied roughly perpendicular to the longitudinal axis of the deck 20, differential motion between the moving parts in the actuating element 100 make it possible for the wheels 40 to come into contact with the one or the other brake pads 700 thereby slowing the rotation of the wheels. The brake pad 700 material will preferably apply braking force gradually as the differential motion between the moving parts of the actuating element 100 increases from their resting position. The position at which the brake pads 700 are mounted to the bottom of the deck 20 prevents the wheels from contacting the pads 700 without some sufficient differential motion on the moving parts of the actuating element 100.

Figure 18:
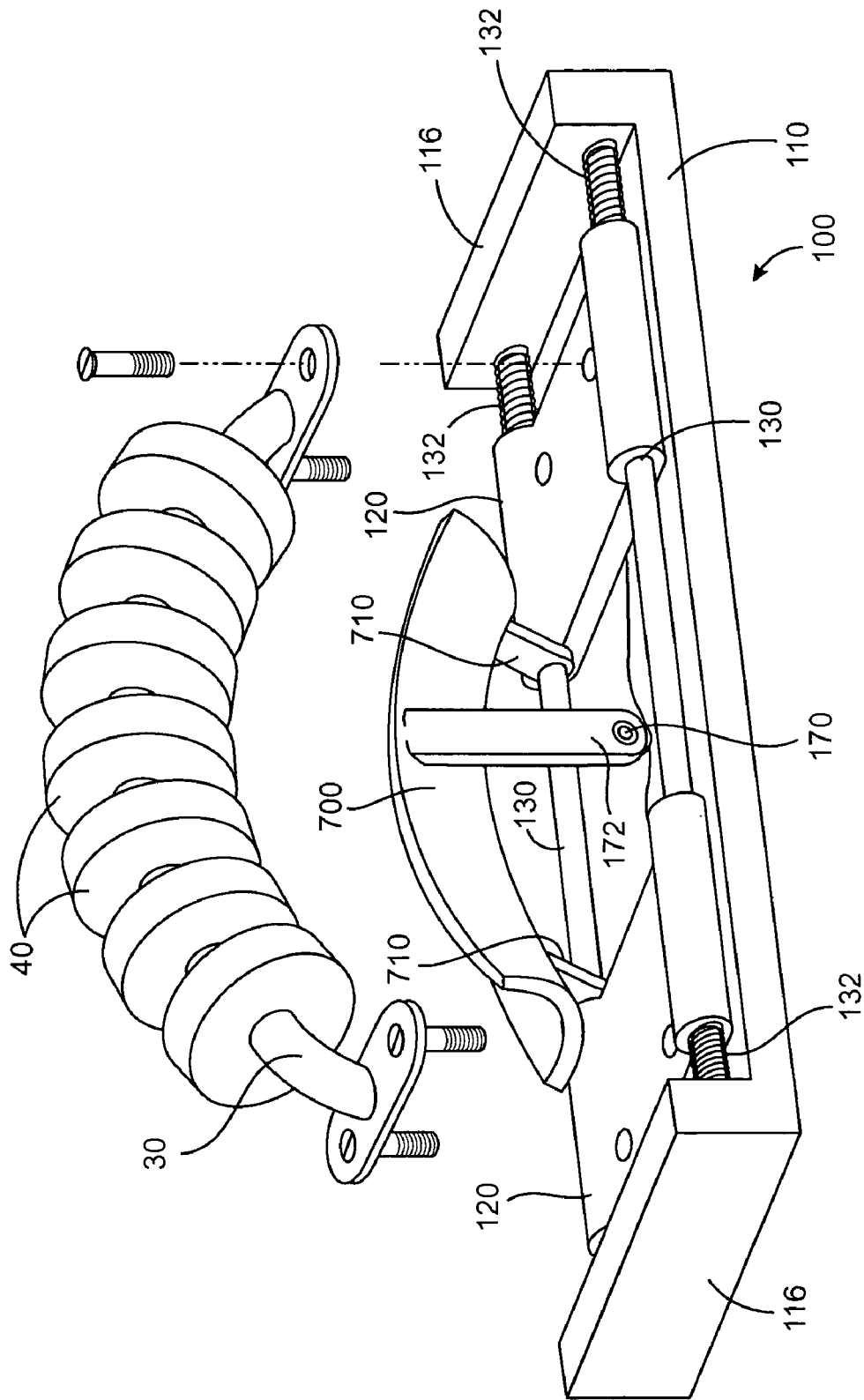
FIG. 18 shows a perspective view of a skateboard with another embodiment of the actuating element on a unique truck with no moving parts and with a dynamic brake pad.

FIG. 18 shows a perspective view of an embodiment of the actuating element 100 incorporating a non-standard skateboard truck 30. The truck 30 in this embodiment is of a design by Flowboard™ having a plurality of wheels 40 attached to the skateboard truck 30. The Flowboard truck 30 in this design has no moving parts and consists of a uniquely shaped curved axle, which typically attaches to the bottom of a skateboard deck 20. As shown in FIG. 18, the actuating element 100 comprises a deck plate 110 and a pair of truck plates 120. The pair of truck plates 120 is configured to each receive one end of the curved axle of the truck 30 and is attachable to the truck plates 120 through two pair of openings 122. The truck 30 can be secured by screws or other suitable devices to the truck plate 120 through the two pair of openings 122.

The truck plate 110 has a braking track 160 which is a raised surface on the side of the deck plate 110 which faces away from the deck. The braking track 160 is preferably a continuous track configured to receive a braking wheel 170, which extends from the braking pad 700 via a wheel bracket 172. The braking track 160 is positioned between the pair of cylindrical rods 130. In addition, the braking track 160 preferably has a rolling contour, which is configured to extend the braking pad 700 into at least one of the plurality of wheels 40 when there is lateral displacement of the deck plate 110 relative to the truck plate 120. However, it can be appreciated that the braking track 160 can be relatively flat, or have any number of angulations to extend the braking pad 700 into the wheels 40 of the skateboard 10.

A pair of cylindrical rods 130 extends from one edge 116 of the deck plate 110 to another edge 116 of the deck plate 110 passing through a cylindrical hole within the truck plate 120. A plurality of springs 132 extend from the edges 116 of the deck plate 110 to the first and second edge 126, 128 of the truck plate 120.

The braking pad 700 has a generally curved shape, which mirrors the configuration of the wheels 40. The braking pad 700 is attachable to the pair of cylindrical rods 130 by a pair of rod brackets 710. The rod brackets 710 are connected to the two truck plates 120 by a torsion springs (not shown). One arm of each torsion spring connects to a rod bracket 710. The other arm of each torsion spring connects to the truck plate 120 such that the torsional force in the torsion spring holds the brake pad 700 away from the plurality of wheels 40 when the truck plate 120 is in its spring-centered position relative to deck plate 110.

At rest the truck plate 120 is spring-centered relative to the deck plate 110 and deviates from its centered position (translation along a line parallel to line P) by a lateral force applied across the deck 20 of the skateboard 10. The deviation of truck plate 120 from its spring-centered resting position does not modify the truck axles turning radius in this embodiment, but provides a means of actuating the brake pad 700 to be placed in contact with the wheels. When the truck plate 120 deviates from its spring centered position, the braking wheel 170 rides up along the raised portion of the braking track 160 causing the rod brackets 710 to rotate around the cylindrical rod 130 against the force of the torsion springs connecting the rod bracket 710 to the truck plate 120, thus placing the braking pad 700 in contact with one or more of the wheels 40. It can be appreciated that there are other mechanical means by which the actuating element can generate translation along lines parallel to the P axis as a result of a transverse or lateral force applied roughly perpendicular to the longitudinal axis of the skateboard deck 20 without deviating from this invention. The actuating element 100, which generates these alternative mechanical differential motions, may be integrated into the design of trucks or decks, rather than in separate actuating elements 100 without deviating from this invention. In addition, it can be appreciated that by adapting this unique truck 30 to mount to an actuating element 100, such as those shown in FIGS. 8–11, can provide the means of enhancing the turning characteristics and/or enabling a braking system 400.

The differential motion between moving parts of the actuating element 100 are transferred into the displacement of a braking pad 700 from its original resting position such that it gradually comes into contact with the plurality of wheels 40. In operation, the braking pad 700 does not contact the wheels 40 when the actuating element 100 is in its resting position. In operation, a lateral or transverse force applied roughly perpendicular to the longitudinal axis of the skateboard deck 20 creates the necessary differential motion between the moving parts of the actuating element 100. The brake pad 700 can be configured to engage only a few of the wheels 40 or can be configured to make contact with each of the plurality of wheels 40. It can be appreciated that there are many mechanical means of transferring the differential motion of moving parts within the actuating element 100 to a variety of braking mechanisms without deviating from this invention.

Figure 19A:
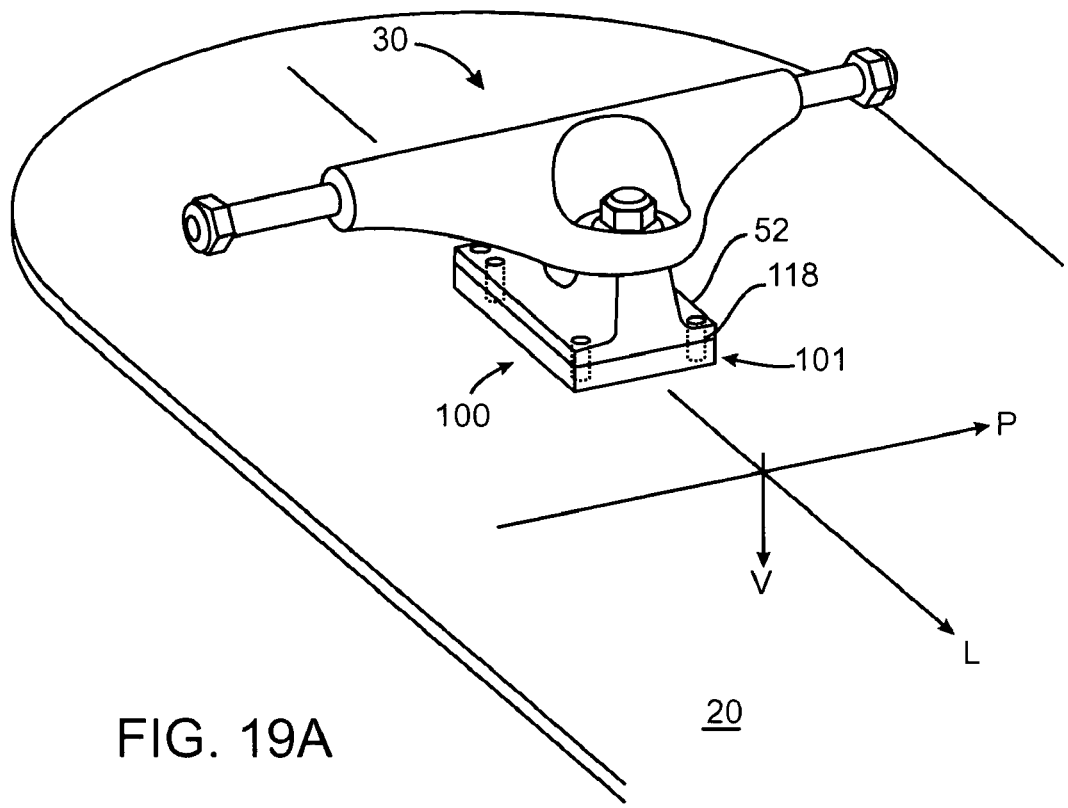
FIG. 19A shows a perspective view of a standard truck and an attached actuating element without lateral displacement.

FIG. 19A shows a perspective view of a standard truck 30 and an attached actuating element 100 without lateral displacement. As shown in FIG. 19A, the actuating element 100 comprises a plate 101 having a plurality of mounting holes 118. The mounting holes 118 attach the actuating element 100 to the skateboard deck 20 and are hidden from view in FIG. 19A by the base plate 52. The pattern or arrangement of the deck mounting holes 118 preferably matches the pre-drilled mounting holes on the base plate 52 of the truck 30. This way, the actuating element 100 can be optionally removed by the rider altogether such that the truck base plate 52 or the actuating element 100 can be mounted within the same holes on the deck 20 of the skateboard 10.

The plate 101 is preferably made of an elastic material, a rubber compound or other suitable material, which allows lateral movement of the base plate 52. As shown in FIG. 19A, the plate 101 has a rectangular shape. However, it can be appreciated that the plate 101 can be oval, round, square or any other configuration without deviating from the present invention. In addition, the base plate 52 is preferably attached to the deck 20 by a plurality of screws. The screws are preferably made of a material having sufficient flexibility to accommodate lateral movement of the base plate 52.

Figure 19B:
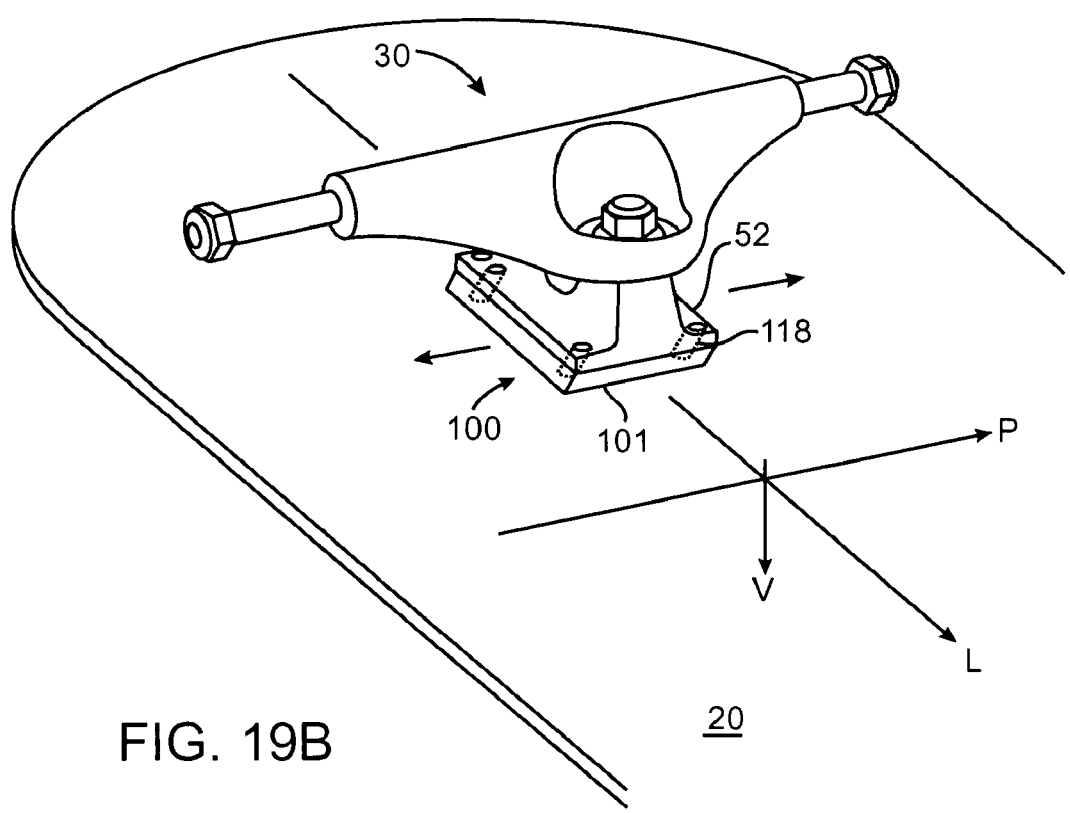
FIG. 19B shows a perspective view of a standard truck and the attached actuating element of FIG. 19A with lateral displacement.

FIG. 19B shows a perspective view of a standard truck and the attached actuating element of FIG. 19A with lateral displacement. As shown in FIG. 19B, upon a lateral force to the deck 20 of the skateboard 10, the plate 101 laterally displaces the base plate 52. The actuating element 100 transfers differential motion between the deck 20 and the truck 30 through the flexible plate 101. Differential motion between the truck and deck can be translated into the necessary motion required for various braking elements described above.

Figure 20:
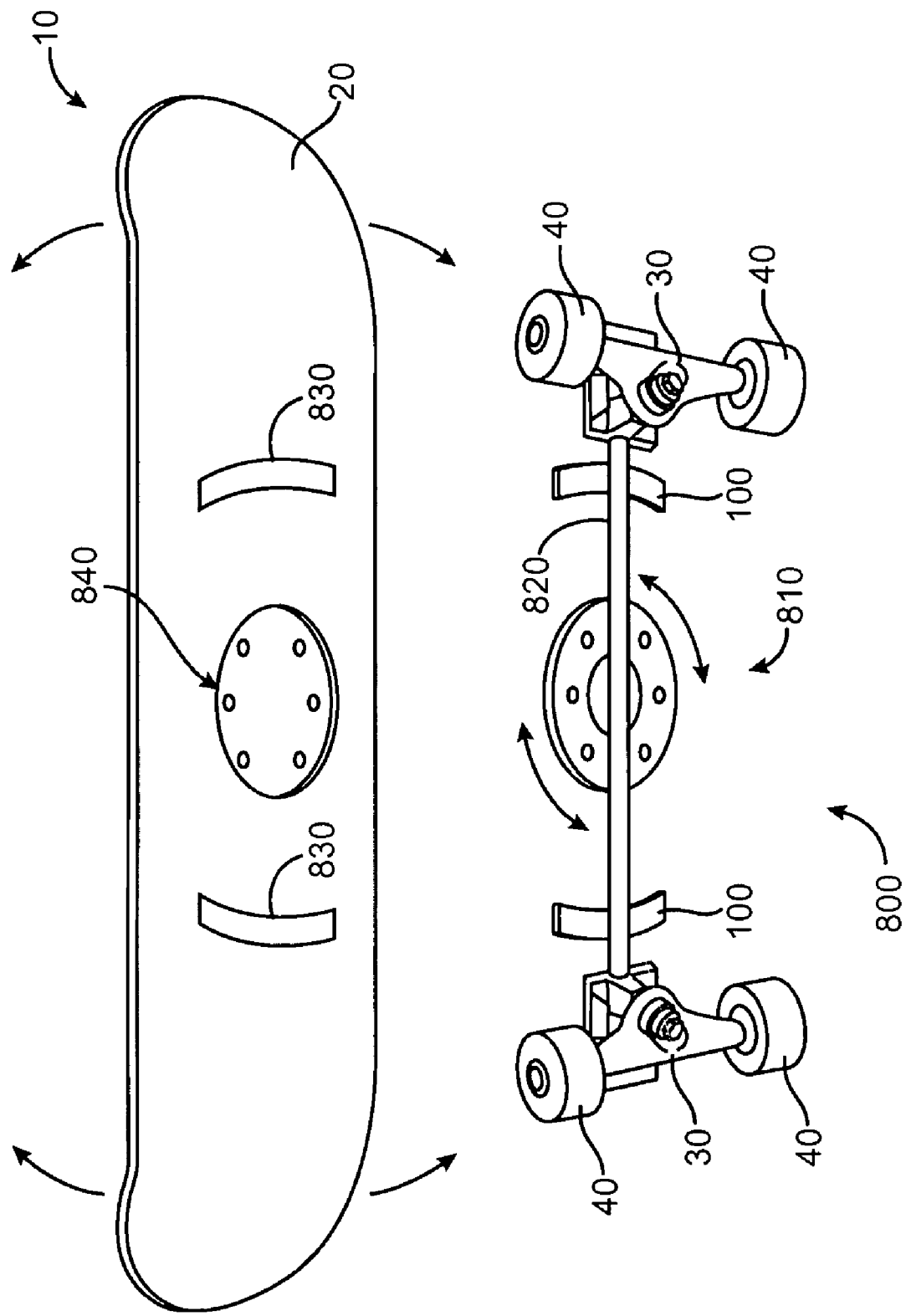
FIG. 20 shows a perspective view of a skateboard and an alternative embodiment of an actuating element having a pivot member.

FIG. 20 shows an alternative embodiment of a skateboard 10 including an actuating element 100. It can be appreciated that the actuating element 100 can be any of the actuating elements 100 as shown in FIGS. 8–11 and 14–19 without departing from the present invention.

As shown in FIG. 20, the skateboard 10 comprises a skateboard deck 20 attached to a pivoting truck system 800. The pivoting truck system 800 comprises a pair of trucks 30 having at least one wheel 40, a pair of actuating elements 100 and a pivot element 810. A support member 820 connects the pair of trucks 30, the actuating elements 100 and the pivot element 810 to one another. The pair of actuating elements 100 is preferably positioned between the pair of trucks 30 with the pivot element 810 preferably positioned an equal distance from each of the actuating elements 100.

The deck 20 comprises a pair of actuating element grooves 830 and a pivot groove 840 configured to receive the actuating elements 100 and the pivot element 810, respectively. In this embodiment, the trucks 30 are not directly attached to the deck 20 of the skateboard 10. Rather, the trucks 30 and wheels 40 are attached to the deck 20 of the board 10 via the actuating elements 100 and the pivot element 810 through the corresponding groove 830, 840 on the underside of the skateboard deck 20.

In operation, the deck 20 of the skateboard deck 20 rotates around the pivot element 810, such that the pivoting truck system 800 captures the differential motion across the actuating element 100 to enable braking and/or fishtailing. Dipping of the deck from side to side causes the rotation of the truck axles such that the path of the skateboard 10 turns, as in the typical skateboard. The force of the dipping of the deck must be transferred into the trucks 30 through the pivot element 810 and supporting member 820 Upon an application of a lateral force directed roughly perpendicular to the longitudinal axis of the skateboard deck 20, the deck 20 pivots around the pivot element 810 causing differential motion between the actuating element 100 and their corresponding grooves 830 on the deck 20. The differential motion between the grooves 830 and actuating element 100 can be transferred into the necessary motion required to actuate braking systems as described in earlier sections. Either the pivoting element 810 or the actuating elements 100 may contain elements which tend to resist the rotation of the deck 20 relative to the pivoting truck system 800.

In addition, the pivoting truck system 800 prevents or minimizes a straightening of the path of the skateboard 10 when the rider's weight is approximately vertically centered on the deck 20 of the skateboard. The pivot element 810 limits the movement of the actuating elements 100, such that upon a turning motion wherein the rider's weight is center on the deck 20 of the skateboard 10, the actuating elements 100 will not in unison move towards the lower edge of the skateboard 10. Rather, the pivot member 810 allows the actuating elements 100 to maintain a center positioned and only upon a force to one end of the deck 20 does a change occur in the relative position of the actuating element 100 and the deck 20 of the skateboard.

Although, the actuating element 100 in FIGS. 8–11 and 14–20 are preferably independent features separate and distinct from the other skateboard elements (trucks 30, decks 20, and their component parts) it can be appreciated that the actuating element 100 can be integrated into the design of these other skateboard elements (trucks 30, decks 20, and their component parts) without deviating from this invention. It can also be appreciated that these actuating elements 100 can be incorporated into a variety of wheels platforms and vehicles other than skateboards without deviating from this invention.

The actuating element 100 can also include at least one sensor 900 (FIG. 16) configured to deliver a signal to a receiver (not shown) having a CPU or microprocessor. The sensor 900 is preferably an electric or an electronic sensor; however, it can be appreciated that any suitable sensor can be used.

It can be appreciated that actuating element 100 as described in the various embodiments may consist of components that do not resemble "plates" in their physical dimensions. For example, the deck plate 110 can be replaced with at least one rod attachable directly to the skateboard deck. Alternatively, the truck, or truck plate 120 to which a truck is mounted, can be configured to slide on the rod. In addition, other embodiments can include a deck plate 110 with grooves into which a truck mounting plate fits directly.

In yet a further embodiment, rotation around the V axis can include a rotating arm (cylindrical in shape) performing the function of the truck plate 120. The truck 30 can be attachable to a flat portion of the arm, such that the embodiment does not include a plate as described herein It can be appreciated that additional embodiments include adaptation of the steering enhancement and braking functionality can extended to inline skates, roller skates, wheeled skis, scooters, and any other wheeled platform without deviating from this invention.

While the invention has been described with reference to the preferred embodiments described above, it will be appreciated that the configuration of this invention can be varied and that the scope of this invention is defined by the following claims.

What is claimed is:

1. A brake actuation for a skateboard comprising:
   a skateboard truck;
   an actuating element comprising:
      a deck plate configured to be attachable to a skateboard deck; and
      a truck plate configured to be attachable to the skateboard truck and the deck plate, wherein upon an application of a force to the skateboard deck, the position of the truck plate relative to the deck plate changes; and
   a brake system, wherein the brake system is engaged by differential motion of the actuating element and configured to reduce a rotational velocity of a wheel, the brake system comprising a pair of calipers, each caliper having an actuator cable connected thereto, wherein each brake caliper includes a brake pad, and wherein the differential motion between the deck plate and the truck plate causes one of the actuator cables to pull the actuator cable anchored on one end of the caliper arm, thereby forcing the brake pad to come in contact with the wheel.

2. A brake actuation system for a skateboard comprising:
   a truck;
   an actuating element comprising:
      a deck plate configured to be attachable to a platform; and
      a truck plate configured to be attachable to the truck and the deck plate, wherein upon an application of a force to the skateboard deck, the position of the truck plate relative to the deck plate changes; and
   a brake system, wherein the brake system is engaged by differential motion of the actuating element and configured to reduce a rotational velocity of a wheel, the brake system comprising a pair of calipers, each caliper having an actuator cable connected thereto, wherein each brake caliper includes a brake pad, and wherein the brake system is engaged by differential motion of the actuating element and configured to reduce a rotational velocity of a wheel, wherein the differential motion between the deck plate and the truck plate causes one of the actuator cables to pull the actuator cable anchored on one end of the caliper arm, thereby forcing the brake pad to come in contact with the wheel.

3. The brake actuation system of claim 2, wherein the differential motion between the platform and the truck is generated by a rider who creates torque around the pivot connection axis between the at least one platform and the truck.

4. The brake actuation system of claim 2, wherein a brake cable and brake cable housing are anchored to the platform and the truck, and the differential motion between the platform and the deck mechanically draws the brake cable through the brake cable housing, thereby actuating the brakes.

5. The brake actuation system of claim 2, wherein the platform is the deck of a skateboard and the truck is one of at least one skateboard truck.

6. The brake actuation system of claim 2, wherein the differential motion between the platform and the truck is generated by the rider who applies force laterally relative to the direction in which the wheeled platform is traveling.

* * * * *